(12) United States Patent
Chung et al.

(10) Patent No.: US 9,747,694 B2
(45) Date of Patent: Aug. 29, 2017

(54) METHOD AND APPARATUS FOR OPTIMIZING DEPTH INFORMATION

(71) Applicant: Altek Semiconductor Corp., Hsinchu (TW)

(72) Inventors: Yu-Chia Chung, Taipei (TW);
Wen-Yan Chang, Miaoli County (TW);
Chia-Chun Tseng, Hsinchu (TW);
Yun-Chin Lee, New Taipei (TW)

(73) Assignee: Altek Semiconductor Corp., Hsinchu (TW)

( * ) Notice: Subject to any disclaimer, the term of this patent is extended or adjusted under 35 U.S.C. 154(b) by 348 days.

(21) Appl. No.: 14/304,983

(22) Filed: Jun. 16, 2014

(65) Prior Publication Data

US 2015/0319421 A1 Nov. 5, 2015

(30) Foreign Application Priority Data

Apr. 30, 2014 (TW) .............................. 103115567 A

(51) Int. Cl.
*H04N 13/02* (2006.01)
*G06F 17/50* (2006.01)
(Continued)

(52) U.S. Cl.
CPC ............ *G06T 7/0075* (2013.01); *G06T 5/006* (2013.01); *G06T 7/174* (2017.01); *G06T 7/593* (2017.01);
(Continued)

(58) Field of Classification Search
CPC ........... G06T 7/75; G06T 15/00; H04N 13/02; G06K 9/00
See application file for complete search history.

(56) References Cited

U.S. PATENT DOCUMENTS 8,351,685 B2 1/2013 Ho et al.
2003/0037101 A1 2/2003 Torabi
(Continued)

FOREIGN PATENT DOCUMENTS

TW 201218121 5/2012

OTHER PUBLICATIONS

Wang et al, "Stereoscopic Inpainting: Joint Color and Depth Completion from Stereo Images", IEEE Conference on Computer Vision and Pattern Recognition(CVPR ), 2008, Jun. 23-28, 2008, pp. 1-8.
(Continued)

*Primary Examiner* — Sath V Perungavoor
*Assistant Examiner* — Patricia I Young
(74) *Attorney, Agent, or Firm* — Jianq Chyun IP Office

(57) ABSTRACT

Method and apparatus for optimizing depth information are provided. One of a left image and a right image is divided into a plurality of segmentations for obtaining a plurality of segmentation maps. A necessary repair depth map is obtained, and the necessary repair depth map is partitioned into a plurality of depth planes according to a plurality of primary depth values and a camera parameter. The primary depth values are recorded in the necessary repair depth map having a plurality of holes. A plurality of optimized depth values are respectively generated for the holes in each of the depth planes by using the segmentation maps, and the optimized depth values are filled into the depth planes to obtain an optimized depth map.

14 Claims, 15 Drawing Sheets

(51) Int. Cl.
*G06T 7/00* (2017.01)
*G06T 5/00* (2006.01)
*G06T 7/593* (2017.01)
*G06T 7/174* (2017.01)
*H04N 13/00* (2006.01)

(52) U.S. Cl.
CPC ..... *H04N 13/0007* (2013.01); *H04N 13/0271* (2013.01); *G06T 2207/10012* (2013.01); *H04N 2013/0081* (2013.01)

(56) References Cited

U.S. PATENT DOCUMENTS

| | | | |
|---|---|---|---|
| 2004/0095357 A1 | 5/2004 | Oh et al. | |
| 2006/0072041 A1 | 4/2006 | Kii | |
| 2011/0074927 A1* | 3/2011 | Perng | H04N 13/0239 348/46 |
| 2011/0157155 A1 | 6/2011 | Turner et al. | |
| 2013/0155050 A1 | 6/2013 | Rastogi et al. | |
| 2015/0109409 A1* | 4/2015 | Isogai | H04N 13/0011 348/43 |

OTHER PUBLICATIONS

"Office Action of Taiwan Counterpart Application", issued on Jul. 1, 2016, p. 1-p. 5.

\* cited by examiner

METHOD AND APPARATUS FOR OPTIMIZING DEPTH INFORMATION

CROSS-REFERENCE TO RELATED APPLICATION

This application claims the priority benefit of Taiwan application serial no. 103115567, filed on Apr. 30, 2014. The entirety of the above-mentioned patent application is hereby incorporated by reference herein and made a part of this specification.

BACKGROUND OF THE INVENTION

Field of the Invention

The invention relates to a method and an apparatus for processing images, and more particularly, relates to a method and an apparatus for optimizing depth information.

Description of Related Art

As image processing technology develops and thrives, stereo vision has been gradually and widely applied to a variety of fields. The stereo vision in broad terms can include two stages. In the former stage, depth information is generated by using a depth camera, a stereo camera or a method, such as a three-dimension (3D) imaging algorithm, and in the later stage, images in different vision angles are generated according to the depth information. Accordingly, in order to generate a 3D image with better visual perception, accurate depth information plays a very important role.

As for a stereoscopic imaging system having dual lenses, images in different angles related to one scene can be captured by using the dual lenses of the stereoscopic imaging system, and depth information of each object in the images may be estimated according to information of pixel difference between images captured by the left and the right lenses and distance between the two lenses. Generally, the depth information can be represented in a depth map, and depths of different objects or pixels in a two-dimensional (2D) image are represented by using depth values recorded on the depth map. Therein, a depth generation algorithm based on local-correlation and pixel-wise matching is common to the stereoscopic imaging systems having dual lenses.

However, a depth map generated based on the local-correlation may have an edge blur issue, while the pixel-wise matching method may also lead to significant calculation and great consumption in memory resources. In other words, different algorithms for generating the depth information have different accuracies and calculation amounts. Therefore, how to generate accurate depth information under a condition with a permissible calculation amount and complexity as well as to enhance quality of the 3D image generated according to the depth information has been an important goal to be achieved by the persons skilled in the field.

SUMMARY OF THE INVENTION

Accordingly, the invention is directed to a method and an apparatus for optimizing depth information, and capable of lowering noise of the depth information while increasing accuracy of the depth information, so that the three dimensional image generated by the three dimensional imaging system may provide a better visual experience.

The invention proposes a method for optimizing depth information which is adapted to an electronic apparatus. Therein, a left image and a right image are generated through shooting of a three dimensional imaging system and the method includes the following steps. One of a left image and a right image is divided into a plurality of segmentations for obtaining a plurality of segmentation maps. A necessary repair depth map is obtained, and the necessary repair depth map is partitioned into a plurality of depth planes according to a plurality of primary depth values and a camera parameter, wherein the necessary repair depth map records the primary depth values and has a plurality of holes. A plurality of optimized depth values are respectively generated for the holes in each of the depth planes by using the segmentation maps, and the optimized depth values are filled into the depth planes to obtain an optimized depth map combining each of the depth planes.

In an embodiment of the invention, the step of obtaining the necessary repair depth map and partitioning the necessary repair depth map into the depth planes according to the primary depth values and the camera parameter includes the following steps. An object distance information of each of the primary depth values is decided according to the primary depth values and the camera parameter. The necessary repair depth map is divided into the depth planes corresponding to a plurality of depth-of-field ranges different from one another according to the object distance information of each of the primary depth values, wherein each of the depth planes includes at least one similar object distance zone.

In an embodiment of the invention, the step of dividing the one of the left image and the right image into the segmentations for obtaining the segmentation map includes the following steps. A dividing fineness of each of the depth planes is decided, and the one of the left image and the right image associated with the necessary repair depth map is divided into the segmentations according to the dividing finenesses for obtaining the segmentation maps respectively corresponding to each of the depth planes.

In an embodiment of the invention, the depth planes are respectively corresponding to a plurality of depth-of-field ranges different from one another, and the dividing fineness of each of the depth planes is decided based on the depth-of-field ranges corresponding to each of the depth planes.

In an embodiment of the invention, the left image or the right image divided into the segmentations has a plurality of first pixels, and the step of dividing the one of the left image and the right image associated with the necessary repair depth map into the segmentations according to the dividing finenesses includes the following steps. A first neighboring pixel and a second neighboring pixel neighboring to each other among the first pixels are compared for obtaining a pixel value difference. Whether to connect the first neighboring pixel and the second neighboring pixel is decided according to whether the pixel value difference is less than a difference threshold, so as to partition each of the first pixels into the corresponding segmentations, wherein the dividing fineness of the segmentation maps is decided according to the difference threshold.

In an embodiment of the invention, the step of dividing the one of the left image and the right image associated with the necessary repair depth map into the segmentations according to the dividing finenesses further includes the following steps. The segmentation dimension of each of the segmentations is restricted according to a dimension threshold to obtain the segmentation maps. The segmentation dimension of each of the segmentations is not greater than the dimension threshold, and the dividing fineness of the segmentation maps is decided according to the dimension threshold.

In an embodiment of the invention, the step of respectively generating the optimized depth values for the holes in each of the depth planes by using the segmentation maps, and filling the optimized depth values into the depth planes to obtain the optimized depth map combining each of the depth planes includes the following steps. At least one similar object distance zone of each of the depth planes is divided into a plurality of first depth segmentations according to the segmentation maps respectively corresponding to each of the depth planes, and a first valid density value is obtained according to an amount of the holes in each of the first depth segmentations. Whether to calculate a first depth statistic value of each of the first depth segmentations is decided according to the first valid density value, and a part of the holes is filled by using the first depth statistic value served as one of the optimized depth values.

In an embodiment of the invention, the step of deciding whether to calculate the first depth statistic value of each of the first depth segmentations according to the first valid density value includes the following steps. A processing sequence of each of the first depth segmentations is obtained according to the first valid density value of each of the first depth segmentations. Whether to fill the holes in each of the first depth segmentations is decided according to whether the processing sequence is a high priority sequence.

In an embodiment of the invention, before the step of obtaining the necessary repair depth map, the method further includes the following steps. A three dimensional depth estimation is performed on the left image and the right image for obtaining a primary depth map associated with one of the left image and the right image and corresponding to a plurality of first pixels. The primary depth map records a plurality of primary depth values respectively corresponding to the first pixels. Whether the primary depth values corresponding to the first pixels match a reliability condition is determined by using the segmentation maps, and a plurality of invalid depth values mismatching to the reliability condition among the primary depth values are removed from the primary depth map, so as to generate the necessary repair depth map having the holes.

In an embodiment of the invention, the step of determining whether the primary depth values corresponding to the first pixels match the reliability condition by using the segmentation map, and removing the invalid depth values mismatching to the reliability condition among the primary depth values from the primary depth map, so as to generate the necessary repair depth map having the holes includes the following steps. The primary depth map is divided into a plurality of depth segmentations according to the segmentation maps, and a statistics operation is performed on the primary depth values in each of the depth segmentations to obtain a statistic result. Whether the primary depth values are a plurality of first invalid depth values among the invalid depth values is determined according to the statistic result, and the first invalid depth values are removed from the primary depth map, so as to generate holes on the necessary repair depth map.

From another prospective, the invention proposes an apparatus for optimizing depth information, and the apparatus obtains a left image and a right image through a three dimensional imaging system. The apparatus includes a storage unit recorded with a plurality of modules and one or more processing units. The processing unit is coupled to the storage unit to access and execute the modules recorded in the storage unit. The modules include a depth estimation module, a segmentation map obtaining module, an invalid depth removal module and a hole-filling module. The segmentation map obtaining module divides one of the left image and the right image into a plurality of segmentations for obtaining a plurality of segmentation maps. The depth plane dividing module obtains a necessary repair depth map, and partitions the necessary repair depth map into a plurality of depth planes according to a plurality of primary depth values and a camera parameter. The primary depth values are recorded in the necessary repair depth map having a plurality of holes. The hole-filling module respectively generates a plurality of optimized depth values for the holes in each of the depth planes by using the segmentation map, and fills the optimized depth values into the depth planes to obtain an optimized depth map combining each of the depth planes.

Based on above, according to the embodiments of the invention for optimizing depth information, the necessary repair depth map having holes are first divided into depth planes according to the object distance information corresponding to each of the depth values, and then the holes of each of the depth planes are filled through the segmentation maps generated by segmentations dividing manners with different dimensions. Accordingly, the invention is capable of further deciding the dividing fineness of the segmentation maps according to the depth-of-field ranges corresponding to each of the depth planes, so as to generate the optimized depth values by adaptively using different segmentations dividing manners according to the object distance information. Accordingly, the invention may generate the optimized depth values which are more close to the real condition according to the depth information surrounding the holes, so as to generate the depth map with low noise and high accuracy.

To make the above features and advantages of the disclosure more comprehensible, several embodiments accompanied with drawings are described in detail as follows.

DESCRIPTION OF THE EMBODIMENTS

Figure 1:
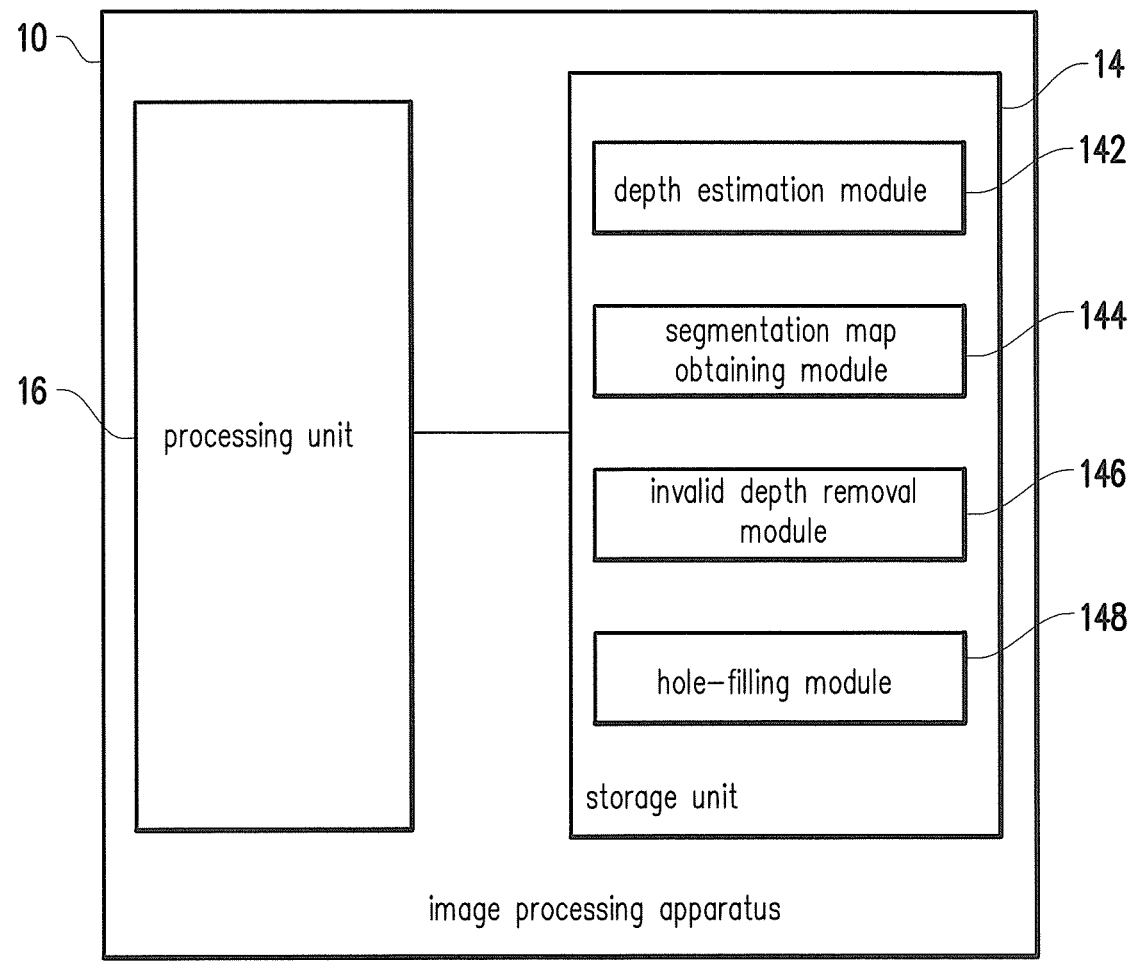
FIG. 1 is a block diagram illustrating an apparatus for generating depth information according to an embodiment of the invention.

FIG. 1 is a block diagram illustrating an apparatus for generating depth information according to an embodiment of the invention. Referring to FIG. 1, an image processing apparatus 10 of the present embodiment is, for example, a mobile phone, a tablet computer, a desktop computer, a notebook computer or a three dimensional camera including a three dimensional imaging system (not illustrated), but the invention is not limited thereto. In other words, the image processing apparatus 10 may be an image capturing apparatus including the three dimensional imaging system. In addition, the image processing apparatus 10 may also be other electronic apparatuses coupled to the image capturing apparatus including the three dimensional imaging system, but the invention is not limited thereto. The image processing apparatus 10 includes a storage unit 14 and one or more processing units (only one processing unit 16 is illustrated in the present embodiment for example, but the invention is not limited thereto), and functions thereof are described as follows.

The storage unit 14 is, for example, a random access memory (RAM), a flash memory or memories, and configured to store data and a plurality of modules. The modules include a depth estimation module 142, a segmentation map obtaining module 144, an invalid depth removal module 146 and a hole-filling module 148. The modules are, for example, computer programs capable of being loaded into the processing unit 16 for executing functions of generating depth information. In other words, the processing unit 16 is coupled to the storage unit 14 and configured to execute modules for controlling the image processing apparatus 10 to execute the functions of generating depth information The processing unit 140 may be, for example, a central processing unit (CPU), a microprocessor, an application specific integrated circuits (ASIC), a programmable logic device (PLD) or other hardware devices with a computing capability.

Figure 2:
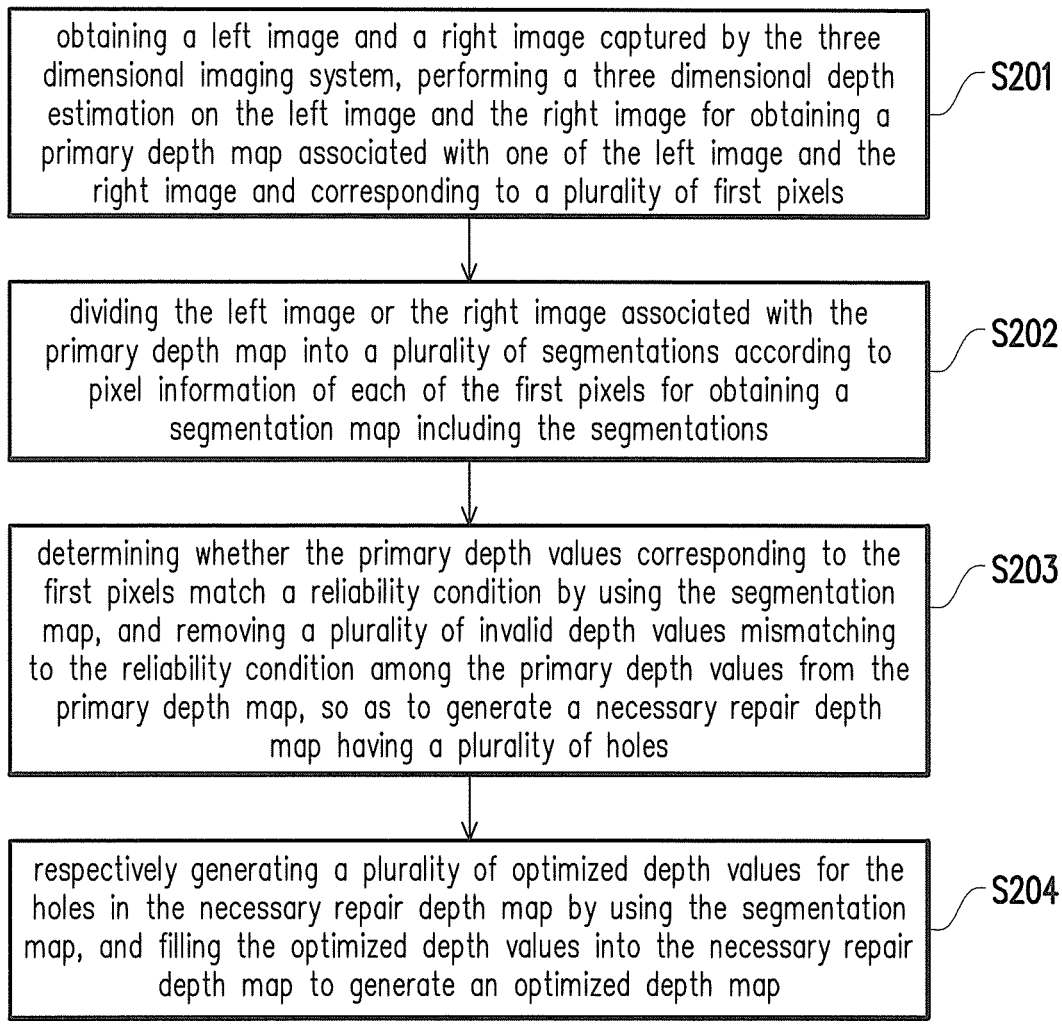
FIG. 2 is a flowchart illustrating a method for generating depth information according to an embodiment of the invention.

FIG. 2 is a flowchart illustrating a method for generating depth information according to an embodiment of the invention. Referring to FIG. 2, the method of the present embodiment is adapted to the image processing apparatus 10 depicted in FIG. 1. The following detailed steps are elaborated to describe the method for generating depth information of the invention with the reference to each element of the image processing apparatus 10.

First, the depth estimation module 142 obtains a left image and a right image captured by the three dimensional imaging system, performs a three dimensional depth estimation on the left image and the right image for obtaining a primary depth map associated with one of the left image and the right image and corresponding to a plurality of first pixels (step S201). The primary depth map records a plurality of primary depth values respectively corresponding to the first pixels. More specifically, in an embodiment, the three-dimensional imaging system includes two image sensing modules, and the two image sensing modules may be divided into a left image sensing module and a right image sensing module according to lenses disposing positions thereof. Accordingly, when user presses a shutter button or issues a capturing command, the left image sensing module and the right image sensing module may capture images of the same scene in different angle (the left image ad the right image).

More specifically, the left image includes a plurality of left pixels, and the right image includes a plurality of right pixel. The depth estimation module 142 may calculate disparities between the left pixels and the right pixels corresponding to each other on the left image and the right image. Therein, the disparities are an offset between the left pixels and the right pixels corresponding to each other on the left image and the right image. Accordingly, the depth estimation module 142 is capable of estimating a depth value of each of the left pixels on the left image and a depth value of each of the right pixels on the right image according to focus length for capturing the left image and the right image respectively by the left lens and the right lens, a spacing between the left lens and the right lens and the disparity between the left pixel and the right pixel corresponding to each other. In other words, the depth estimation module 142 is capable of obtaining a left depth map by serving the left image as a base and a right depth map by serving the right image as another base.

It should be noted that, the primary depth map of the present embodiment may be the left depth map by serving the left image as a base, and may also be the right depth map by serving the right image as another base, which is not particularly limited by the invention. In other words, when the primary depth map is the left depth map, multiple primary depth values corresponding to the left pixels are recorded on the primary depth map. When the primary depth map is the right depth map, multiple primary depth values corresponding to the right pixels are recorded on the primary depth map.

Returning back to processes of FIG. 2, the segmentation map obtaining module 144 divides the left image or the right image associated with the primary depth map into a plurality of segmentations according to pixel information of each of the first pixels for obtaining a segmentation maps including the segmentations (step S202). In other words, when the primary depth map is the left depth map, the segmentation map obtaining module 144 divides the left image into a plurality of segmentations according to pixel information of each of the left pixels for obtaining a segmentation maps including the segmentations. On the other hand, when the primary depth map is the right depth map, the segmentation map obtaining module 144 divides the right image into a plurality of segmentations according to pixel information of each of the right pixels for obtaining a segmentation maps including the segmentations.

In an embodiment, the segmentation map obtaining module 144 compares a first neighboring pixels and a second neighboring pixel among the left pixels (the right pixels) for determining whether a pixel value difference between the first neighboring pixel and the second neighboring pixel is less than difference threshold. Herein, the pixel value difference is generated by subtracting a pixel value of the first neighboring pixel from a pixel value of the second neighboring pixel. In this case, if absolute value of the pixel value difference is less than the difference threshold, the segmentation map obtaining module 144 connects the first neighboring pixel and second neighboring pixel for forming a first segmentation of the segmentations. The first segmentation at least includes the first neighboring pixel and the second neighboring pixel.

Specifically, when the primary depth map is the left depth map, the segmentation map obtaining module 144 is, for example, capable of calculating a color parameter of each of the left pixels to obtain the pixel value of each of the left pixels, so as to use the pixel values as the pixel information for generating the segmentation map. For instance, the segmentation map obtaining module 144 may calculate the RGB (red, green, blue) chroma components of the left pixel for obtaining the pixel values of the left pixels on the different chroma channels. Similarly, the segmentation map obtaining module 144 may also calculate the brightness (Y) and the chroma components (Cb, Cr) for obtaining the pixel values of the left pixel on the brightness channel or the chroma channels.

Accordingly, the segmentation map obtaining module 144 may generate the pixel value difference by comparing the pixel values of two neighboring left pixels, and decide whether to connect the two neighboring pixels according to the pixel value difference between the two neighboring pixels. If the pixel value difference between the two neighboring pixels is less than the difference threshold, the two neighboring pixels are divided into the same segmentation. Namely, the left image is divided into various segmentations according to a color performance of each of the left pixels, and the color performances of the left pixels in the same segmentation are similar to on another.

Figure 3A:
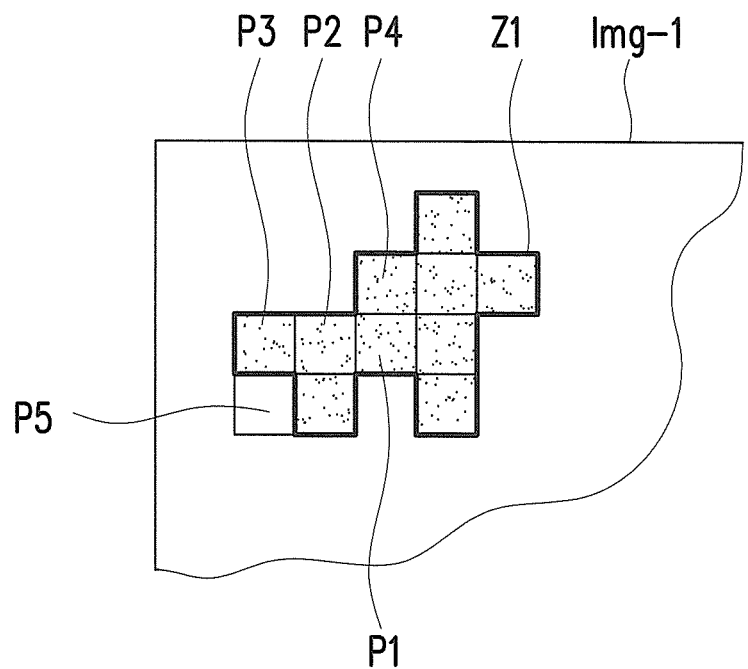
FIG. 3A is a schematic diagram of an example for dividing the left image and the right image.

For instance, FIG. 3A is a schematic diagram of an example for dividing the left image and the right image. Referring to FIG. 3A, it is assumed that an image Img1 includes pixels P1 to P5. In this example, the segmentation map obtaining module 144 first uses the pixel P1 as a datum point and calculate the pixel value of the pixel P1. Next, the segmentation map obtaining module 144 compares the pixel values of the pixel P1 and other surrounding pixels. As shown in FIG. 3A, the pixel value difference between the pixel P1 and the pixel P2 is less than the difference threshold, thus the segmentation map obtaining module 144 connects the pixel P1 and the pixel P2. Similarly, the pixel value difference between the pixel P1 and the pixel P4 is less than the difference threshold, thus the segmentation map obtaining module 144 connects the pixel P1 and the pixel P4.

Furthermore, the pixel value difference between the pixel P1 and the pixel P3 is less than the difference threshold, thus the segmentation map obtaining module 144 connects the pixel P1 and the pixel P3. On the contrary, the pixel value difference between the pixel P1 and the pixel P5 is greater than the difference threshold, thus the segmentation map obtaining module 144 does not connects the pixel P1 and the pixel P5, such that the pixel P5 is not divided into a segmentation z1. In short, by comparing the pixel values between the pixels neighboring each other, the segmentation map obtaining module 144 may obtain the segmentation z1 formed by using the pixel P1 as a datum point, and the color performance of each pixel in the segmentation z1 is similar to the color performance of the pixel P1.

In view of above, the image Img1 are divided into multiple segmentations according to a position and the pixel value of each pixel, and the segmentation map obtaining module 144 may also obtain at least one segmentation map including the segmentations. It can be known that, a segmentation dimension covered by each of the segmentations increases as the difference threshold rises. In addition, in an embodiment, the segmentation map obtaining module 144 may further restrict the segmentation dimension of each of the segmentations according to a dimension threshold to obtain the corresponding segmentation map, wherein the segmentation dimension of each of the segmentations is not greater than the dimension threshold. Also, the segmentation dimension covered by each of the segmentations increases as the dimension threshold rises. In summary, based on settings of the difference threshold and the dimension threshold, the segmentation map obtaining module 144 is capable of deciding a dividing fineness of the different segmentation maps.

Figure 3B:
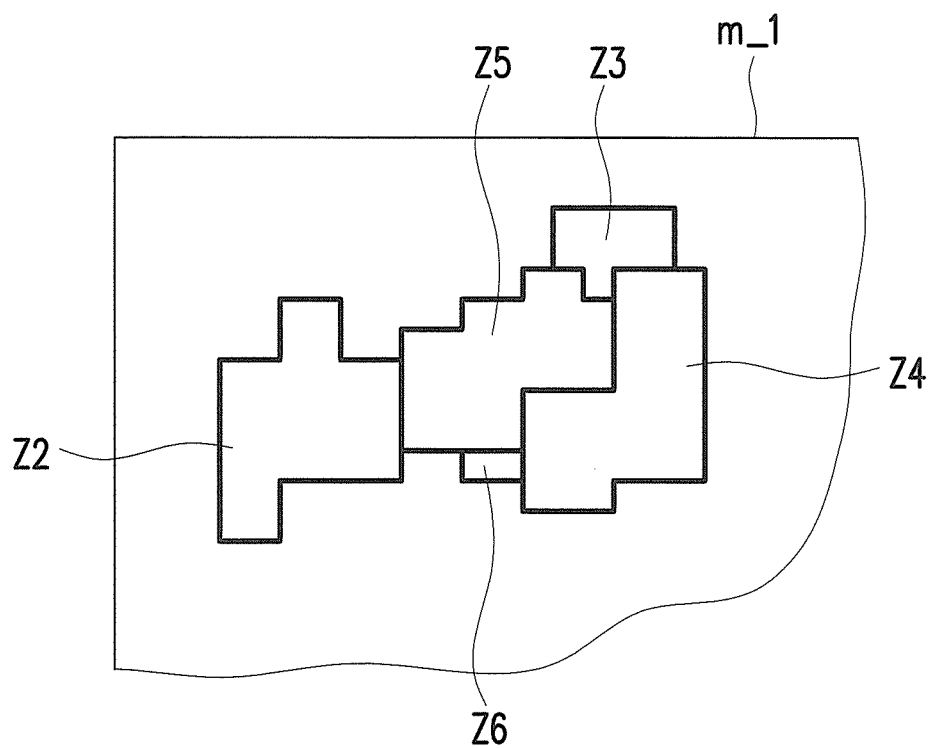
FIG. 3B is a schematic diagram of an example for a part of the segmentation map.

In other words, after the segmentation map obtaining module 144 decided the difference threshold, a manner for setting the datum point and the dimensional threshold, the segmentation map obtaining module 144 may obtain at least one segmentation map having a specific dividing fineness by dividing the image into multiple segmentations. For instance, FIG. 3B is a schematic diagram of an example for a part of the segmentation map. Referring to FIG. 3B, a segmentation map m_1 includes a plurality of segmentations z2 to z6, and sizes and shapes for covered zones of the segmentations z2 to z6 are different from one another. However, the invention is not limited thereto. Persons with ordinary knowledge in the art should be able to choose the difference threshold, the manners for setting the datum point and the dimensional threshold according to practical demands, thus related description is omitted hereinafter.

Returning back to processes of FIG. 2, the invalid depth removal module 146 determines whether the primary depth values corresponding to the first pixels match a reliability condition by using the segmentation maps, and removes a plurality of invalid depth values mismatching to the reliability condition among the primary depth values from the primary depth map, so as to generate a necessary repair depth map having a plurality of holes (step S203). Specifically, the invalid depth removal module 146 may be informed of the depth information surrounding each of the primary depth values by using the segmentation maps, and determines whether each of the primary depth values matches a reliability condition according to other depth information surrounding each of the primary depth values, so as to remove the primary depth values deemed as the invalid depth values from the primary depth map to generate the necessary repair depth map.

Thereafter, the hole-filling module 148 respectively generates a plurality of optimized depth values for the holes in the necessary repair depth map by using the segmentation map, and fills the optimized depth values into the necessary repair depth map to generate an optimized depth map (step S204). Specifically, any one of the segmentation maps is obtained according to level of similarity in the pixels and positions of the pixels, thus a specific correlation is provided to the pixels in the same segmentation on the left image or the right image. Therefore, the invalid depth removal module 146 may divide the primary depth map into a plurality of depth segmentations by using the segmentation maps generated by the segmentation map obtaining module 144, whereas the primary depth values in the same segmentation are in a specific correlated relation.

Accordingly, based on the characteristic of the specific correlation of the primary depth values in the same segmentation, the invalid depth removal module 146 and the hole-filling module 148 may determine whether each of the primary depth values is the invalid depth value and generate the optimized depth value which are more preferable for filling into the holds generated by removing the invalid depth values. As a result, the image processing apparatus 10 of the present embodiment is capable of performing further optimization on the depth map by using image content provided by the raw left image or the raw right image to generate the optimized depth map with higher degree of accuracy.

Figure 4:
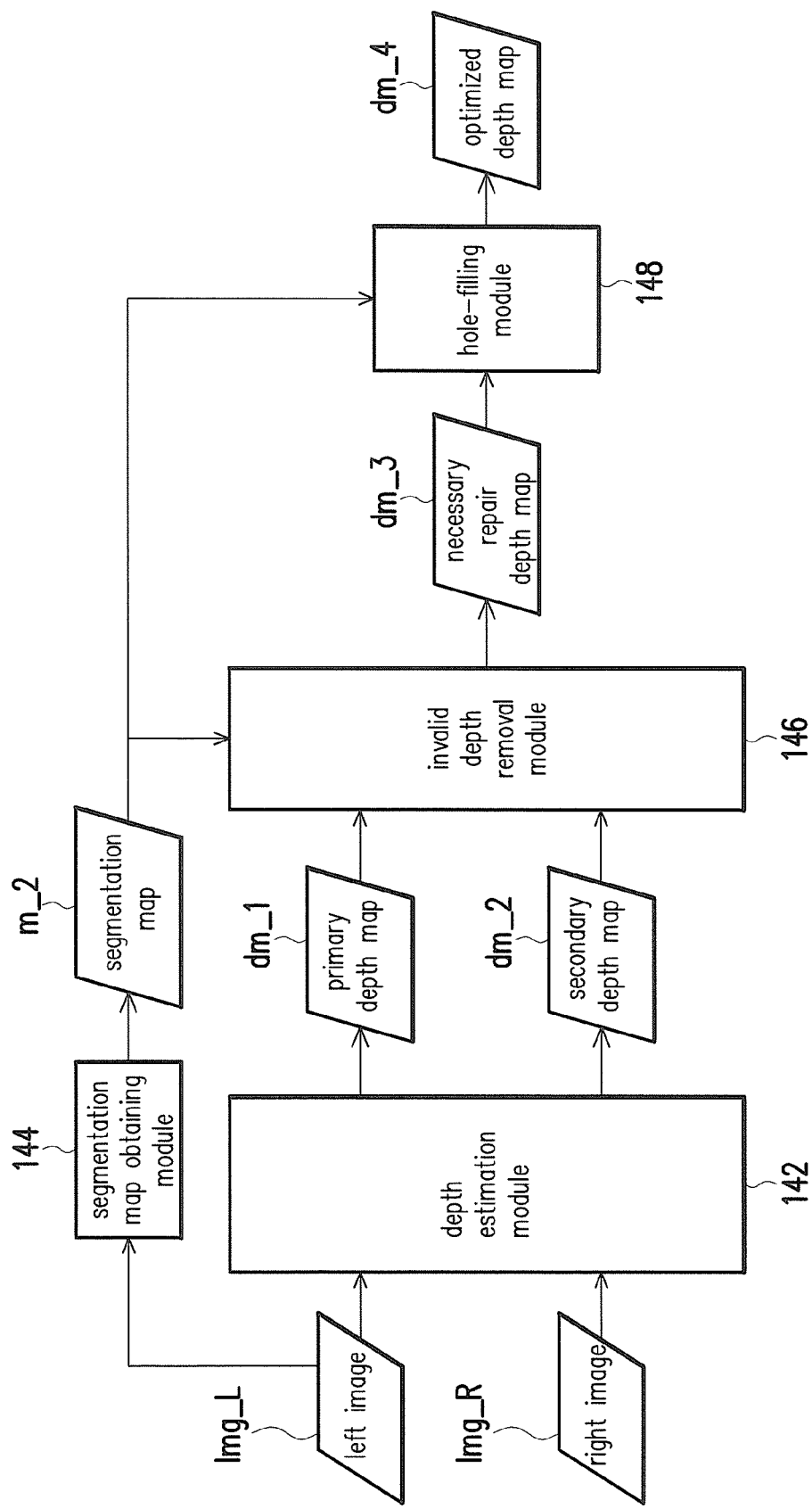
FIG. 4 is a schematic diagram illustrating operations of the method for generating depth information according to an embodiment of the invention.

To explain the invention more clearly, FIG. 4 is a schematic diagram illustrating operations of the method for generating depth information according to an embodiment of the invention. Referring to FIG. 4, the depth estimation module 142 receives a left image Img_L and a right image Img_R captured by the three dimensional imaging system. The depth estimation module 142 performs the three dimensional depth estimation on the left image Img_L and the right image Img_R to obtain a primary depth map dm_1 and a secondary depth map dm_2. In the present embodiment, the primary depth map dm_1 is, for example, the left depth map on basis of the left image Img_L, and the secondary depth map dm_2 is, for example, the right depth map Img_R on basis of the right image.

Accordingly, the segmentation map obtaining module 144 divides the left image Img_L into a plurality of segmentations according to pixel information of the image Img_L for obtaining a segmentation map m_2 including the segmentations. The invalid depth removal module 146 hollows out a plurality of holes on the primary depth map dm_1 according to the segmentation map m_2 and the secondary depth map dm_2 to generate a necessary repair depth map dm_3 having the holes. The hole-filling module 148 respectively generates a plurality of optimized depth values for the holes in the necessary repair depth map dm_3 by using the segmentation map m_2, and fills the optimized depth values into the necessary repair depth map dm_3 to generate an optimized depth map dm_4.

Figure 5:
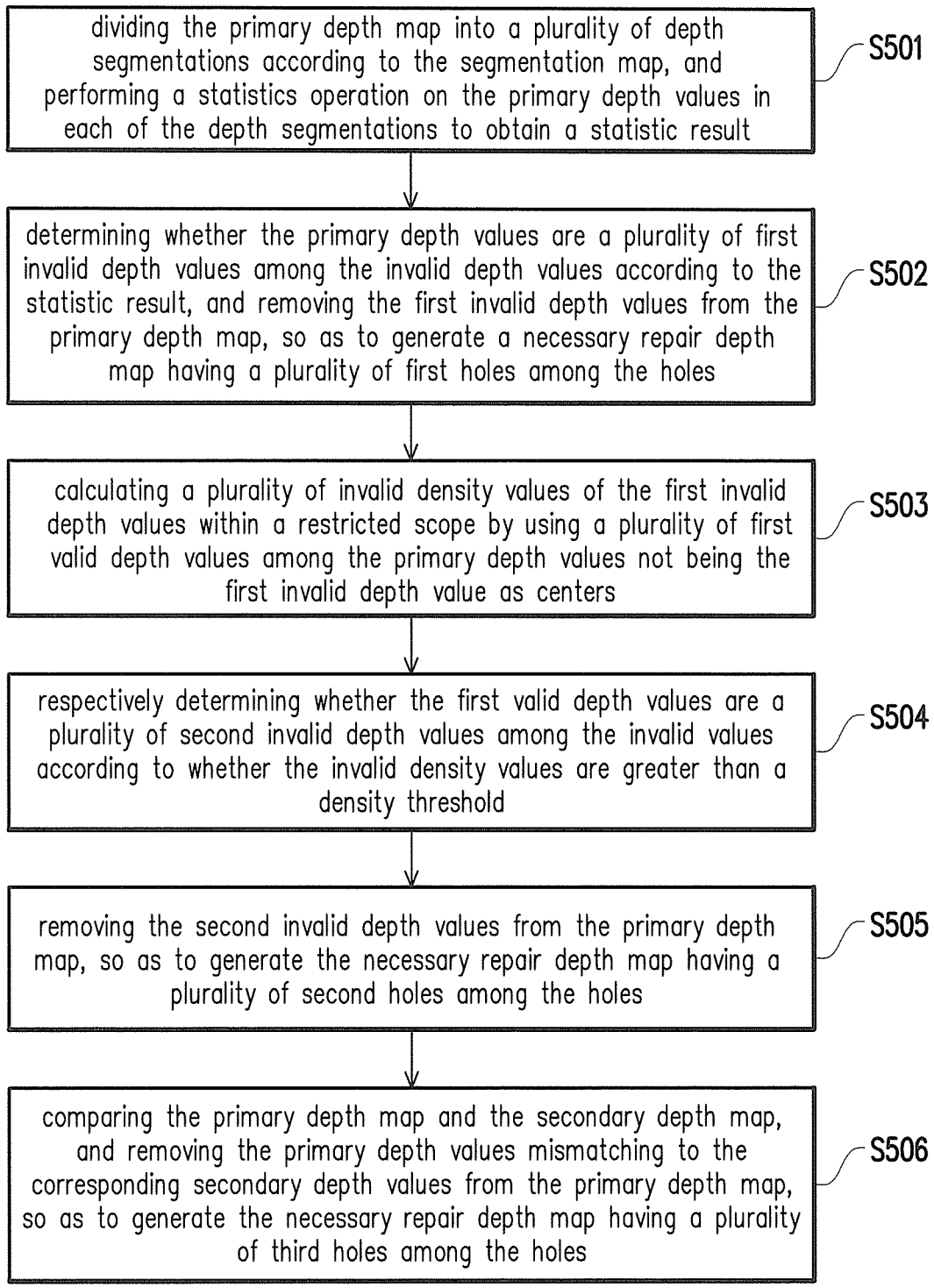
FIG. 5 illustrates a flowchart for generating the necessary repair depth map according to an embodiment of the invention.

In view of the foregoing embodiments, it can be known that, according to different difference thresholds, dimensional thresholds and datum points, the segmentation map obtaining module 144 may obtain the segmentation map m_2 in different segmentation dividing manners. Detailed description regarding how the segmentation map obtaining module 144 generates the segmentation map m_2 has been described in the foregoing embodiments and is not repeated hereinafter. Embodiments are listed below and served to explain how the invalid depth removal module 146 and the hole-filling module 148 removes the invalid depth value and generates the optimized depth values, respectively, by using the segmentation map m_2. FIG. 5 illustrates a flowchart for generating the necessary repair depth map according to an embodiment of the invention, in which detailed steps for generating the necessary repair depth map are provided below with reference to FIG. 4.

Referring to FIG. 4 and FIG. 5 together, the invalid depth removal module 146 divides the primary depth map dm_1 into a plurality of depth segmentations according to the segmentation map m_2, and performs a statistics operation on the primary depth values in each of the depth segmentations to obtain a statistic result (step S501). The statistics operation is, for example, an average value calculation, a mass calculation or a middle value calculation, but the invention is not limited thereto. For instance, the invalid depth removal module 146 may perform the average value calculation on the primary depth value in each of the depth segmentations to obtain a depth average value of each of the depth segmentations. However, in other possible embodiments, persons with ordinary knowledge in the art should be able to choose other appropriate methods for the statistics operation, so as to determine whether the primary depth value is a valid depth value according to the appropriate statistic result, and related description thereof is omitted herein.

Next, the invalid depth removal module 146 determines whether the primary depth values are a plurality of first invalid depth values among the invalid depth values according to the statistic result, and removes the first invalid depth values from the primary depth map dm_1 so as to generate a necessary repair depth map having a plurality of first holes among the holes (step S502). In other words, the invalid depth removal module 146 is capable of determining whether the primary depth value in each of the depth segmentations includes the first invalid depth value. The first invalid depth value may be deemed as invalid for being overly different from most of the other primary depth values in the same segmentation. Accordingly, the invalid depth removal module 146 removes the first invalid depth values from the primary depth map dm_1 to generate the first holes corresponding to the first invalid depth values.

Figure 6:
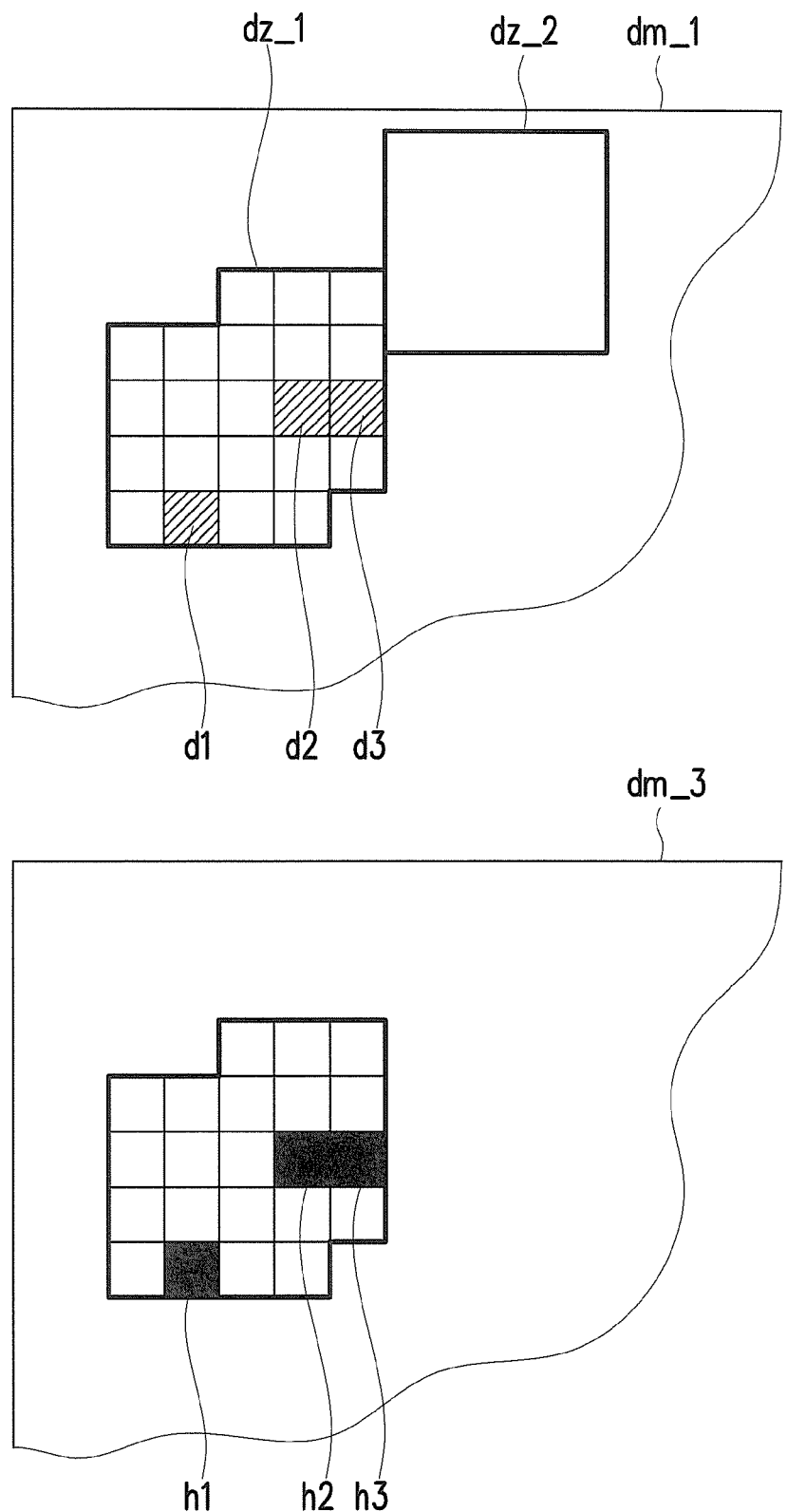
FIG. 6 is a schematic diagram illustrating an example for removing the invalid depth values according to the statistic result according to an embodiment of the invention.

For instance, FIG. 6 is a schematic diagram illustrating an example for removing the invalid depth values according to the statistic result according to an embodiment of the invention. Referring to FIG. 6, it is assumed that the primary depth map dm_1 may be divided according to the segmentation map m_2 to include a depth segmentation dz_1 and a depth segmentation dz_2. In this example, the invalid depth removal module 146 may perform the average value calculation on the primary depth values in the depth segmentation dz_1 to obtain a depth average value of the depth segmentation dz_1. Thus, the invalid depth removal module 146 is capable of determining whether the primary depth values in the depth segmentation dz_1 are the first invalid depth values according to the depth average value. In this example, because the primary depth value d1 in the depth segmentation dz_1 is overly different from the depth average value of the depth segmentation dz_1, the primary depth value d1 is determined as the one of the first invalid depth value.

Similarly, because the primary depth values d2 and d3 in the depth segmentation dz_1 are overly different from the depth average value of the depth segmentation dz_1, the primary depth values d2 and d3 are also determined as the first invalid depth values. Thus, the invalid depth removal module 146 removes the primary depth value d1 deemed as the one of the first invalid depth values from the primary depth map dm_1, so as to generate the necessary repair depth map dm_3 having a hole h1. Similarly, the invalid depth removal module 146 removes the primary depth values d2 to d3 deemed as the part of the first invalid depth values from the primary depth map dm_1, so as to generate holes h2 and h3.

It should be noted that, after being processed by step S501 to step S502, the holes are generated on the necessary repair depth map dm_3 due to removal of the first invalid depth values. Accordingly, in the present embodiment, the invalid depth removal module 146 is capable of determining reliability of the primary depth value according to a density of the invalid depth values surrounding the valid depth values which are not yet removed, or a density of the valid depth values.

Thus, the invalid depth removal module 146 calculates a plurality of invalid density values of the first invalid depth values within a restricted scope by using a plurality of first valid depth values among the primary depth values not being the first invalid depth value as centers (step S503). In addition, a number of the restricted scope may be designed based on actual applications, and the invention is not limited thereto. For instance, the size of the restricted scope may be 5×5 pixels or 10×10 pixels and so on.

Next, the invalid depth removal module 146 respectively determines whether the first valid depth values are a plurality of second invalid depth values among the invalid values according to whether the invalid density values are greater than a density threshold (step S504). Specifically, if there are too few of the valid values surrounding one depth value, the reliability of that depth value is relatively lower. Accordingly, the invalid depth removal module 146 may decide whether the first valid depth values still in the necessary repair map are the second invalid depth value according to a distribution status of the valid depth values. Thereafter, the invalid depth removal module 146 removes the second invalid depth values from the primary depth map dm_1, so as to generate the necessary repair depth map dm_3 having a plurality of second holes among the holes (step S505). Persons with ordinary knowledge in the art should be able to design the density threshold according to practical demands, and the invention is not limited thereto.

Figure 7:
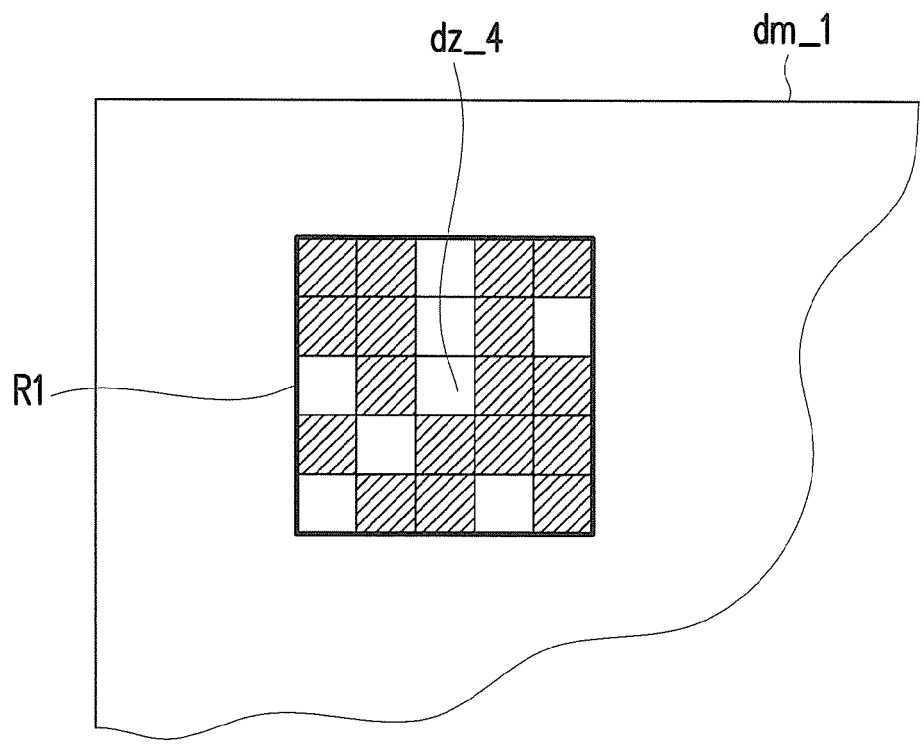
FIG. 7 is a schematic diagram illustrating an example for removing the invalid depth values according to the density according to an embodiment of the invention.
Figure 7:
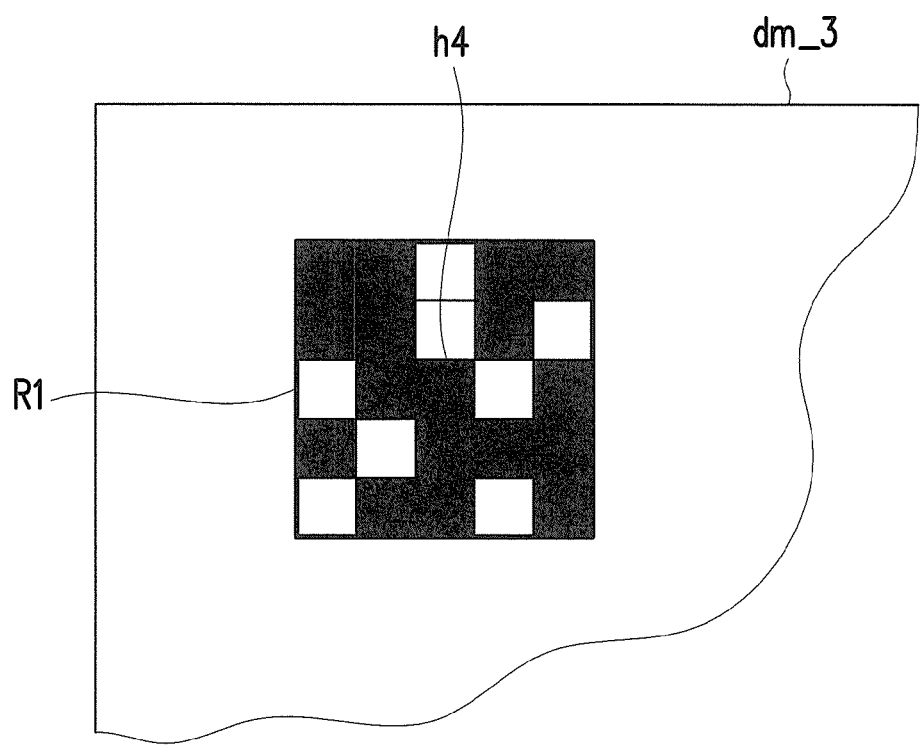

For instance, FIG. 7 is a schematic diagram illustrating an example for removing the invalid depth values according to the density according to an embodiment of the invention. Referring to FIG. 7, in this example, the primary depth map dm_1 includes a primary depth value dz_4, and the primary depth value dz_4 is the valid depth value which is not yet removed. The invalid depth removal module 146 calculates an amount of the invalid depth values within the restricted scope R1 by using the primary depth value dz_4 as the center, and calculates one invalid density value associated with the primary depth value dz_4 according to the amount of the invalid depth values. In the example depicted in FIG. 7, in the restricted scope R1 with the size of 5×5 pixels, seventeen invalid depth values (represented by blocks with slashes) are provided to indicate that the invalid density value associated with the primary depth value dz_4. That is to say, the reliability of the primary depth value dz_4 is overly low. Therefore, in the example depicted in FIG. 7, the invalid depth removal module 146 removes the primary depth value dz_4 deemed as the second invalid depth value from the primary depth map dm_1, so as to generate the necessary repair depth map dm_3 having a hole h4.

Returning back to processes of FIG. 5, the invalid depth removal module 146 further compares the primary depth map dm_1 and the secondary depth map dm_2, and removes the primary depth values mismatching to corresponding secondary depth values from the primary depth map dm_1, so as to generate the necessary repair depth map dm_3 having a plurality of third holes among the holes (step S506). Specifically, the invalid depth removal module 146 determines the reliability of the depth value by cross-checking the left depth map and the right depth map. If the primary depth value on the primary depth map dm_1 is not identical to the corresponding secondary depth value, such primary depth value may be deemed as the invalid depth value.

Overall, in the present embodiment, a first stage removing process for the invalid values on the primary depth map is first performed on the primary depth map by using at least one segmentation map and the statistics operation. Next, a second stage removing process for the invalid values is performed by using the density of the valid depth values. Lastly, a third stage removing process for the invalid values are performed by cross-checking the primary depth map and the second depth map. After performing afore-said three stages of removing processes for the invalid values are preformed, many of the invalid depth values with low reliability may be removed from the primary depth map. After the necessary repair depth map having the holes is generated, the invention may also generate the optimized depth values which more close to the real condition by using the segmentation maps, so as to generate the optimized depth map which is further optimized. An embodiment is provided below to illustrate details regrading the hole-filling module of the invention for filling the holes.

Figure 8:
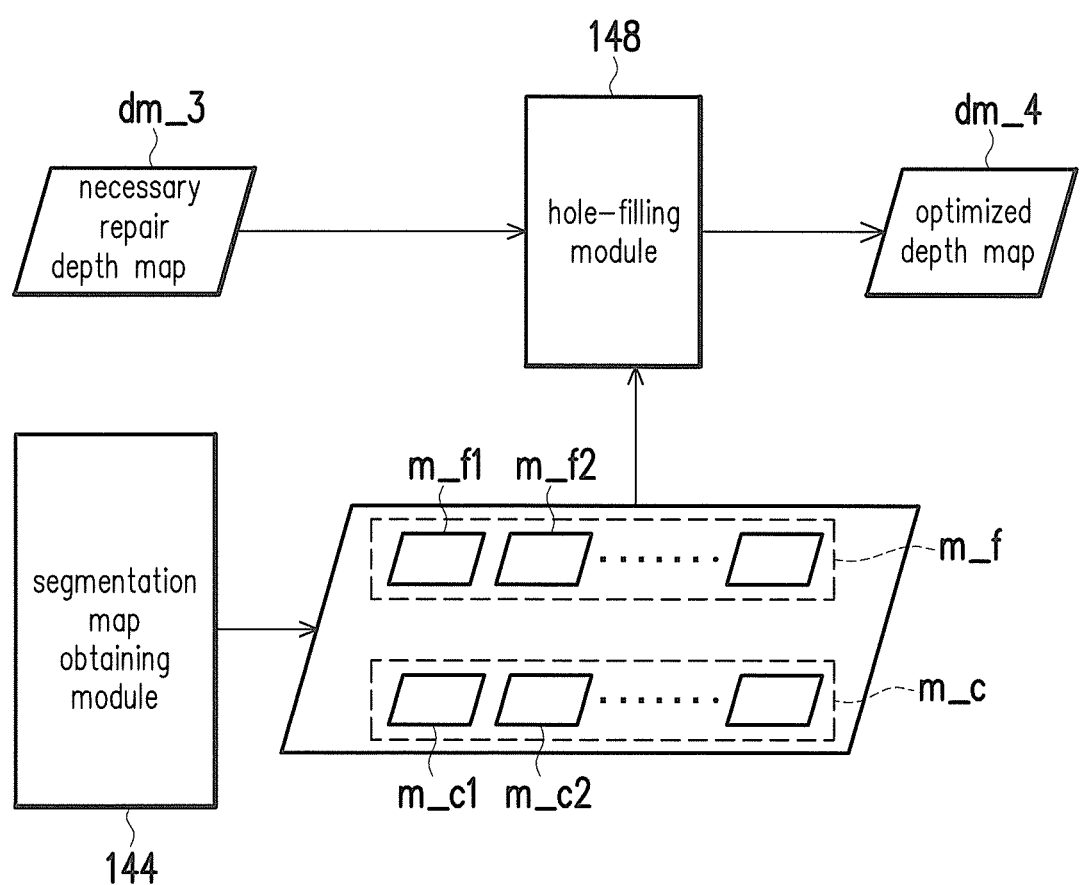
FIG. 8 is a schematic diagram illustrating operations for filling the holes for the necessary repair depth map according to an embodiment of the invention.

FIG. 8 is a schematic diagram illustrating operations for filling the holes for the necessary repair depth map according to an embodiment of the invention. Referring to FIG. 8, the hole-filling module 148 fills the necessary repair depth map dm_3 according to the segmentation map generated by the segmentation map obtaining module 144 to generate the optimized depth map dm_4. It should be specially noted that, in the example depicted in FIG. 8, the segmentation maps generated by the segmentation map obtaining module 144 includes a first segmentation map group m_f and a second segmentation map group m_c, and the dividing fineness corresponding to the first segmentation map group m_f is different from the dividing fineness corresponding to the second segmentation map group m_c.

In brief, based on the descriptions for FIG. 2 and FIG. 3, it can be known that, the difference threshold and the dimension threshold can be used to decide the dividing fineness of the segmentation map. In other words, the segmentation maps obtaining module 144 may generate the first segmentation map group m_f and the second segmentation map group m_c having different dividing finenesses according to the settings of the of the difference threshold and the dimension threshold. Therein, the first segmentation map group m_f includes a plurality of first segmentation maps, and the second segmentation map group m_c includes a plurality of second segmentation maps.

More specifically, in case the first segmentation map group m_f has a fixed dividing fineness based on one set of the difference threshold and the dimension threshold, the segmentation map obtaining module 144 is capable of generating the first segmentation maps in the first segmentation map group m_f according to different manners for setting the datum point. For instance, the first segmentation map group m_f includes a first segmentation map m_f1 and a first segmentation map m_f2. The first segmentation map m_f1 and the first segmentation map m_f2 are corresponding to the same dividing fineness, but the first segmentation map m_f1 and the first segmentation map m_f2 have different segmentation dividing manners.

Similarly, in case the second segmentation map group m_c has a fixed dividing fineness based on one set of the difference threshold and the dimension threshold, the segmentation map obtaining module 144 is capable of generating the second segmentation maps in the second segmentation map group m_c according to different methods for setting the datum point. For instance, the second segmentation map group m_c includes a second segmentation map m_c1 and a second segmentation map m_c2. The second segmentation map m_c1 and the second segmentation map m_c2 are corresponding to the same dividing fineness, but the second segmentation map m_c1 and the second segmentation map m_c2 have different segmentation dividing manners. Accordingly, in an embodiment, the hole-filling module 148 is capable of filling the holes for the necessary repair depth map dm_3 according to the segmentation maps which are corresponding to the different dividing finenesses. Accordingly, in an embodiment, the hole-filling module 148 is capable of filling the holes for the necessary repair depth map dm_3 according to the segmentation maps which are corresponding to the different dividing finenesses.

Figure 9A:
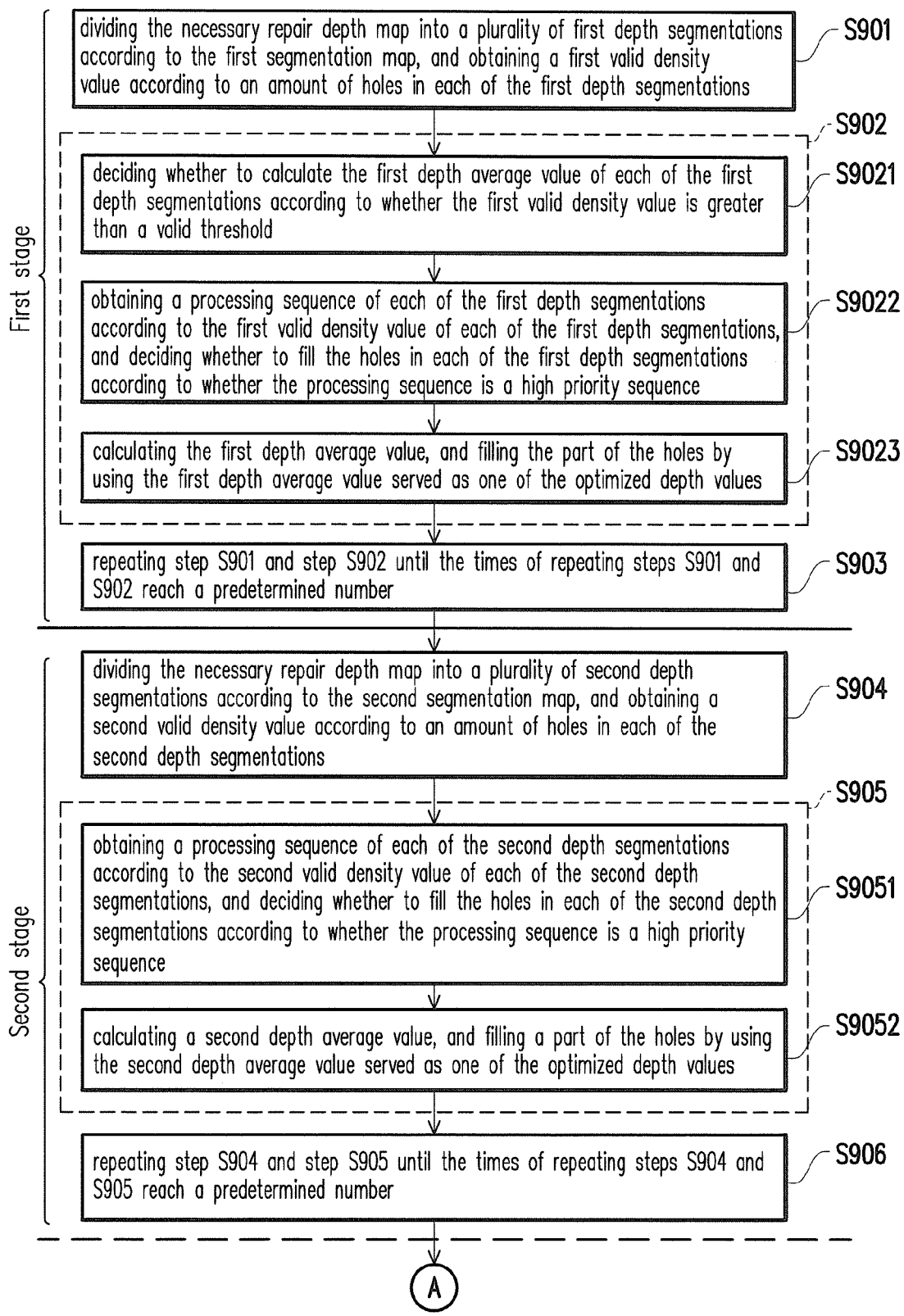
FIG. 9A and FIG. 9B illustrate flowcharts for generating the optimized depth map according to an embodiment of the invention.
Figure 9B:
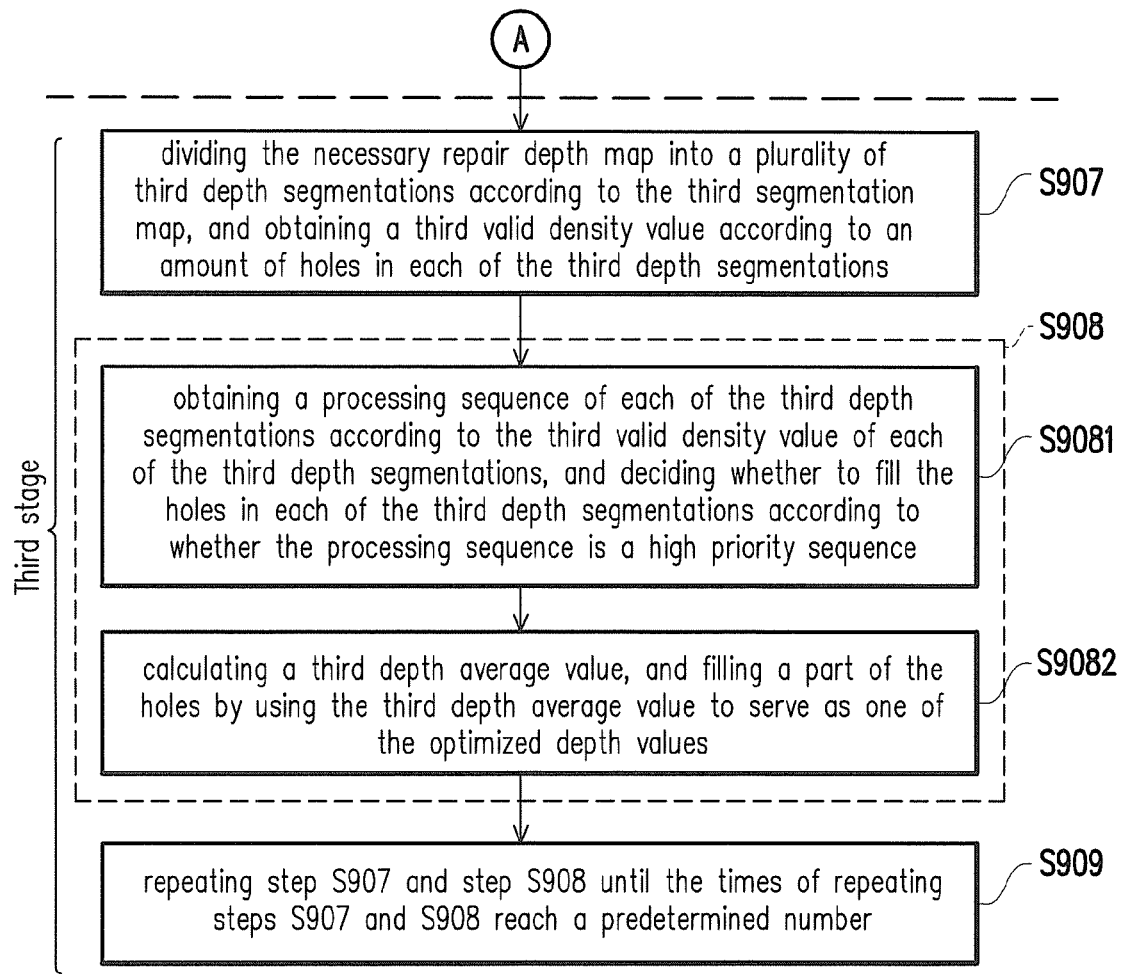

FIG. 9A and FIG. 9B illustrate flowcharts for generating the optimized depth map according to an embodiment of the invention, in which detailed steps for generating the optimized depth map are provided below with reference to FIG. 8, FIG. 9A and FIG. 9B. It should be noted that, in the present embodiment, the hole-filling module 148 performs three stages of hole-filling procedures for the necessary repair depth map dm_3. In a first stage hole-filling procedure, the hole-filling module 148 fills the holes by using the first segmentation map group m_f with the dividing manner of higher density. In a second stage hole-filling procedure, the hole-filling module 148 fills the holes by using the second segmentation map group m_c with the dividing manner of lower density. Namely, in the present exemplary embodiment, the dividing fineness of the first segmentation map group m_f is relatively denser to the dividing fineness of the second segmentation map group m_c.

Lastly, in a third stage hole-filling procedure, the hole-filling module 148 fills the holes by using a third segmentation map group. It should be note that, the dividing fineness of the third segmentation map group is relatively denser to the dividing fineness of the second segmentation map group. It should be specially noted that, in one embodiment, the first segmentation map group m_f may be directly used as the third segmentation map group of the third stage, but the invention is not limited thereto. In another embodiment, the dividing fineness corresponding to the third segmentation map group may also be different from the dividing fineness corresponding to the first segmentation map group m_f.

Referring to FIG. 8, FIG. 9A and FIG. 9B together, the hole-filling module 148 divides the necessary repair depth map dm_3 into a plurality of first depth segmentations according to the first segmentation map m_f1, and obtains a first valid density value according to an amount of holes in each of the first depth segmentations (step S901). It can be known that, the depth values in the same first depth segmentation have a specific correlation, and each of the depth values in the same first depth segmentation should be quite close to one another. Thus, in the present embodiment, the hole-filling module 148 decides whether to calculate a first depth average value of each of the first depth segmentations according to the first valid density value, and fills a part of the holes by using the first depth average value to serve as one of the optimized depth values (step S902). In other words, in the embodiment of the invention, the hole-filling module 148 further determines whether each of the first depth segmentation includes sufficient amount of the valid depth values according to the first valid density value of the first density segmentation. In case the amount of the valid depth values is sufficient, the hole-filling module 148 is capable of generating the optimized depth values with higher reliability.

More specifically, step S902 may be divided into sub-step S9021 to sub-step S9023. First, the hole-filling module 148 decides whether to calculate the first depth average value of each of the first depth segmentations according to whether the first valid density value is greater than a valid threshold (sub-step S9021). Namely, the hole-filling module 148 may first filter out the first depth segmentations with lower reliability. Next, the hole-filling module 148 obtains a processing sequence of each of the first depth segmentations according to the first valid density value of each of the first depth segmentations, and decides whether to fill the holes in each of the first depth segmentations according to whether the processing sequence is a high priority sequence (sub-step S9022).

Specifically, the hole-filling module 148 may calculate the valid density value of each of the first depth segmentations, and sort each of the first depth segmentations according to their valid density values in an ascending manner or a descending manner. Accordingly, the hole-filling module 148 may be informed of which of the first depth segmentation has higher reliability, so as to generate the optimized depth values according to the sufficient amount of the invalid depth values. For instance, after each of the first depth segmentation is sorted by the hole-filling module 148 according to their valid density values, the hole-filling module 148 may first fills the holes for the first depth segmentation with higher valid depth value according to a preset proportional threshold. A range of the preset proportional threshold may fall, for example, within 10% to 70%, but the invention is not limited thereto. Persons with ordinary knowledge in the art may decide the preset proportional threshold based on actual applications, and the invention is not limited thereto. After the first depth segmentations for filling the holes are chosen, the hole-filling module 148 calculates the first depth average value for the chosen first depth segmentations, and fills the part of the holes by using the first depth average value to serve as one of the optimized depth values (sub-step S9023).

It can be known that, in the present embodiment, the hole-filling module 148 does not complete hole-filling for all the holes in one go but fills the holes for regions with higher reliability. Therefore, the hole-filling module 148 repeats step S901 and step S902 until the times of repeating steps S901 and S902 reach a predetermined number (step S903). A range of the predetermined number of times may be, for example, 10 to 100 times, but the invention is not limited thereto. Persons with ordinary knowledge in the art may decide the preset umber of times based on actual applications, and the invention is not limited thereto.

It should be specially noted that, during processes of repeating step S901 and step S902, the hole-filling module 148 fills the holes according to the first segmentation maps having different segmentation dividing manners and included in the first segmentation map group m_f. For instance, the hole-filling module 148 may fill the holes for the necessary repair depth map dm_3 by using the first segmentation map m_f1 and the first segmentation map m_f2 sequentially, wherein the first segmentation map m_f1 and the first segmentation map m_f2 have the same dividing fineness.

Figure 10:
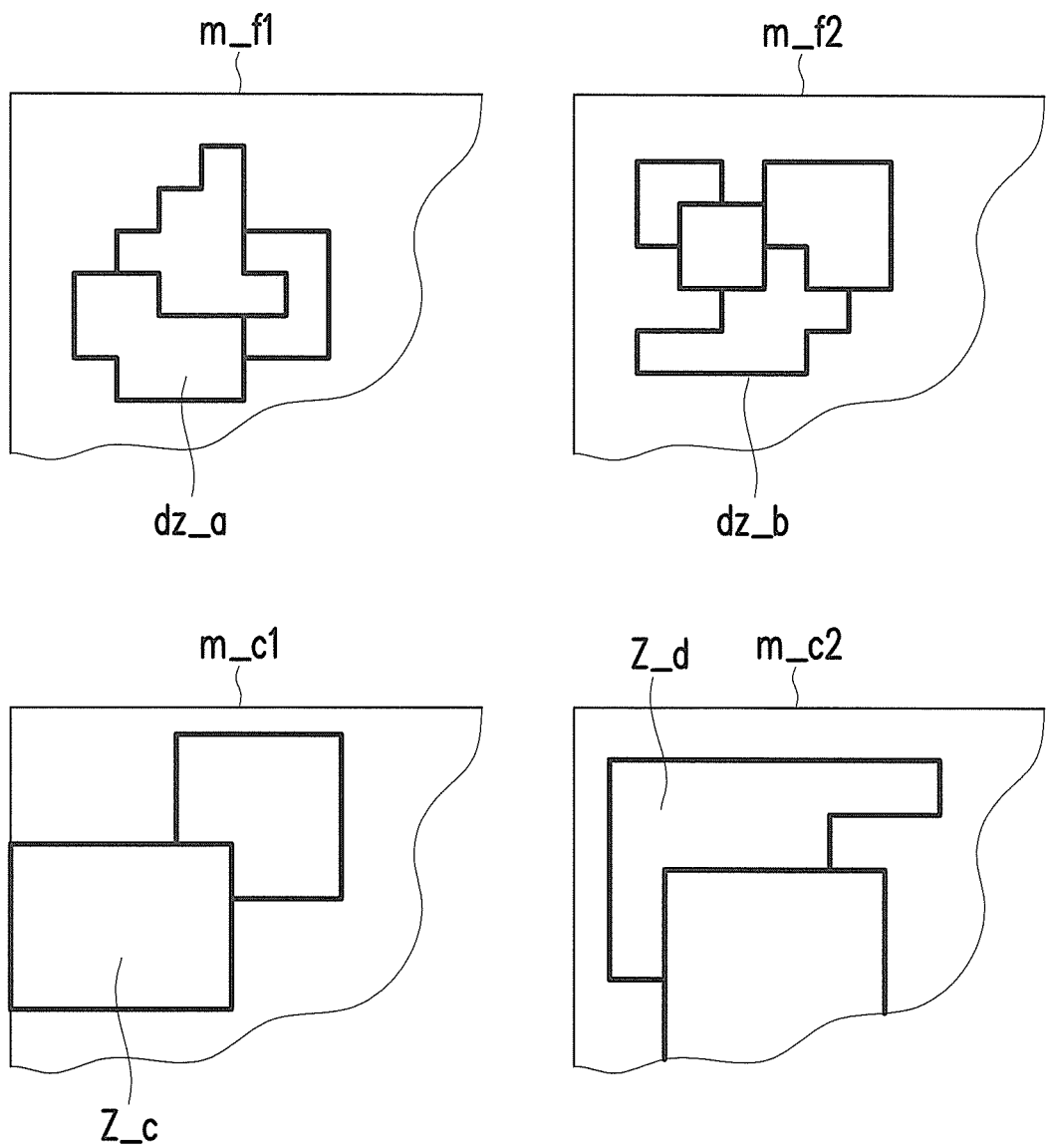
FIG. 10 is a schematic diagram of an example of segmentation map depicted according to the embodiment of FIG. 8.

After the first stage hole-filling procedure is completed, the hole-filling module 148 fills the holes by using the second segmentation map group m_c with the dividing fineness of lower density. For instance, FIG. 10 is a schematic diagram of an example of segmentation map depicted according to the embodiment of FIG. 8. Referring to FIG. 10, the first segmentation map m_f1 and the first segmentation map m_f2 of the first segmentation map group m_f have different dividing manners according to different methods for setting the datum point, but the first segmentation map m_f1 and the first segmentation map m_f2 have the same dividing fineness. In other words, a segmentation dz_a and a segmentation dz_b may be similar in the segmentation dimension but different in dividing shapes.

Similarly, the second segmentation map m_c1 and the second segmentation map m_c2 of the first segmentation map group m_c have different dividing manners according to different methods for setting the center datum point, but the second segmentation map m_c1 and the second segmentation map m_c2 have the same dividing fineness. Therein, the dividing fineness of the first segmentation map group m_f is relatively denser to the dividing fineness of the second segmentation map group m_c. As shown in FIG. 10, a segmentation dimension of the segmentation dz_a on the first segmentation map m_f1 is less than a segmentation dimension of the segmentation dz_b on the second segmentation map m_c1.

Returning back to processes of FIG. 9A, the hole-filling module 148 divides the necessary repair depth map dm_3 into a plurality of second depth segmentations according to the second segmentation map m_c1, and obtains a second valid density value according to an amount of holes in each of the second depth segmentations (step S904). Similarly, the hole-filling module 148 decides whether to calculate a second depth average value of each of the second depth segmentations according to the second valid density value, and fills a part of the holes by using the second depth average value to serve as one of the optimized depth values (step S905). It should be noted that, portions with unclear texture or poor information of contour edges in the necessary repair depth map dm_3 may be repaired by using the second segmentation map group m_f with the dividing fineness of lower density.

Furthermore, step S905 may be divided into sub-step S9051 to sub-step S9052. The hole-filling module 148 obtains a processing sequence of each of the second depth segmentations according to the second valid density value of each of the second depth segmentations, and decides whether to fill the holes in each of the second depth segmentations according to whether the processing sequence is a high priority sequence (sub-step S9051). The hole-filling module 148 calculates a second depth average value, and fills a part of the holes by using the second depth average value to serve as one of the optimized depth values (step S9052). The hole-filling module 148 repeats step S904 and step S905 until the times of repeating steps S904 and S905 reach a predetermined number (step S906). Details regarding the hole-filling module 148 for filling the holes by using the second segmentation map group m_c is similar to details regarding the hole-filling module 148 for filling the holes by using the first segmentation map group m_f, and can be inferred by persons with ordinary knowledge in the art based on above description, which is not repeated hereinafter.

After the second stage hole-filling procedure is completed, the hole-filling module 148 divides the necessary repair depth map dm_3 into a plurality of third depth segmentations according to the third segmentation map, and obtains a third valid density value according to an amount of holes in each of the third depth segmentations (step S907). The hole-filling module 148 decides whether to calculate a third depth average value of each of the third depth segmentations according to the third valid density value, and fills a part of the holes by using the third depth average value to serve as one of the optimized depth values (step S908).

Furthermore, step S908 may be divided into sub-step S9081 to sub-step S9082. The hole-filling module 148 obtains a processing sequence of each of the third depth segmentations according to the third valid density value of each of the third depth segmentations, and decides whether to fill the holes in each of the third depth segmentations according to whether the processing sequence is a high priority sequence (sub-step S9081). The hole-filling module 148 calculates a third depth average value, and fills a part of the holes by using the third depth average value to serve as one of the optimized depth values (step S9082).

The hole-filling module 148 repeats step S907 and step S908 until the times of repeating steps S907 and S908 reach a predetermined number (step S909). Details regarding the hole-filling module 148 for filling the holes by using the third segmentation map group is similar to details regarding the hole-filling module 148 for filling the holes by using the first segmentation map group m_f, and can be inferred by persons with ordinary knowledge in the art based on above description, which is not repeated hereinafter. Accordingly, through the three stages of hole-filling procedures, the hole-filling module 148 sequentially fills the holes on the necessary repair depth map dm_3 according the segmentation maps with different dividing fineness, so as to generate the optimized depth map with high precision.

It is worth mentioning that, the depth map generated by performing the three dimensional depth estimation on the left image and the right image usually includes some unknown regions, such as the unknown regions generated due to insufficient information for generating the depth value at a left edge or a right edge of the depth map. There are no valid depth values surrounding the unknown regions, thus, only error values can be obtained regardless of how to collect the depth values from nearby regions. Nonetheless, because the invention fills the holes by using the segmentation maps and the specific hole-filling conditions, the segmentation maps may be used to fill the holes for the regions with higher reliability first, so as to generate a favorable optimized depth map in a manner of gradually spreading from regions with higher reliability to regions with lower reliability. Accordingly, the method for optimizing depth map of the invention may provide a favorable optimized effect for the unknown regions.

It should be noted that, in the foregoing embodiments, during the process of sequentially generating the optimized depth values by using different segmentation maps, the hole-filling module calculates the entire necessary repair depth map by successively using multiple segmentation maps. However, in another embodiment, the hole-filling module may first divide the necessary repair depth map into a plurality of depth planes, so that segmentation map obtaining module may generate the segmentation maps with different dividing finenesses for each of the depth planes. As a result, the hole-filling module may adaptively optimize hole-filling for each of the depth planes according to the segmentation map corresponding to each of the depth planes. An embodiment is provided below to illustrate details regrading how the invention fills the holes for each of the depth planes by using different segmentation maps.

Figure 11:
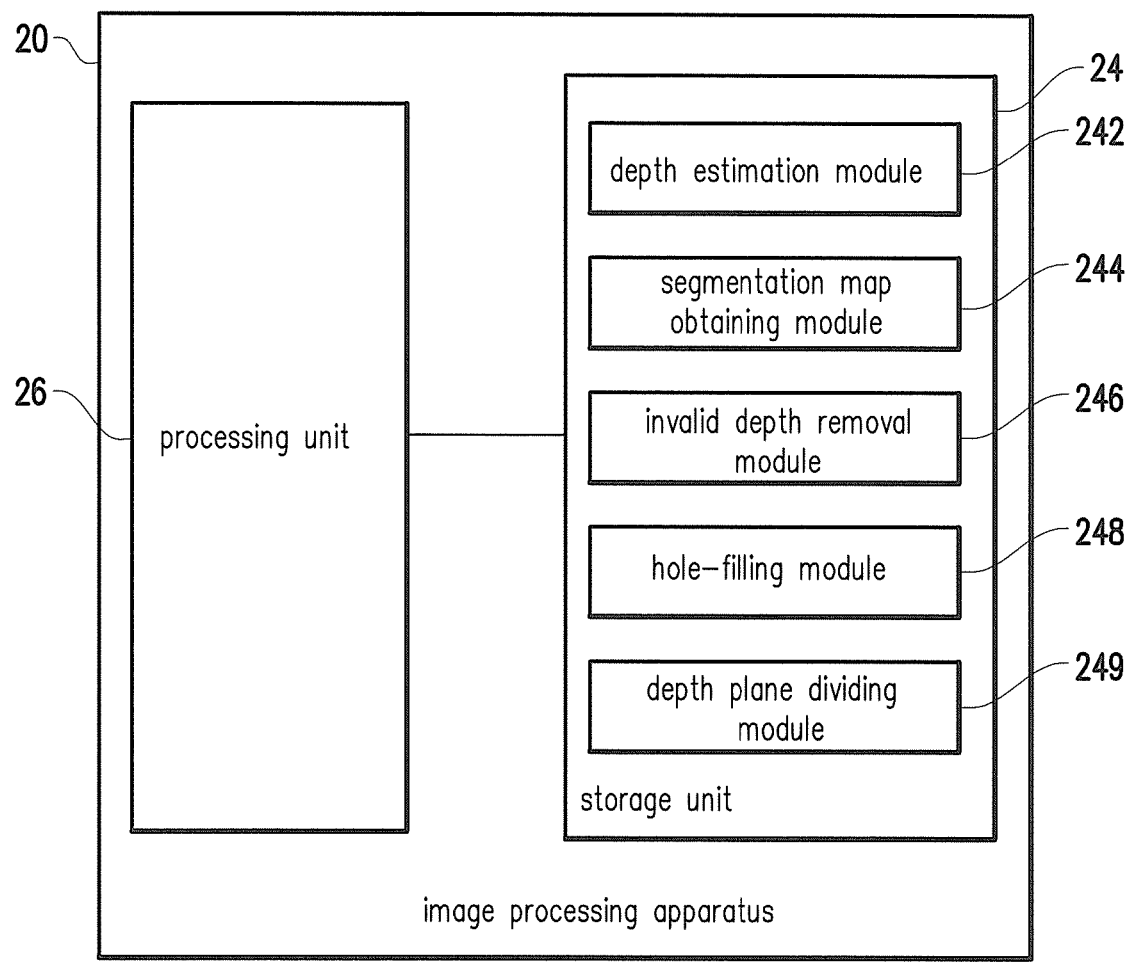
FIG. 11 is a block diagram illustrating an apparatus for optimizing depth information according to an embodiment of the invention.

FIG. 11 is a block diagram illustrating an apparatus for optimizing depth information according to an embodiment of the invention. Referring to FIG. 11, an image processing apparatus 20 of the present embodiment is similar to the image processing apparatus 10 depicted in FIG. 1, such as a mobile phone, a tablet computer, a desktop computer, a notebook computer or a three dimensional camera including a three dimensional imaging system (not illustrated), but the invention is not limited thereto. The image processing apparatus 20 includes a storage unit 24 and one or more processing units (only one processing unit 26 is illustrated in the present embodiment for example, but the invention is not limited thereto).

The storage unit 24 is configured to store data and a plurality of modules. Unlike the embodiment depicted in FIG. 1, in addition to a depth estimation module 242, a segmentation map obtaining module 244, an invalid depth removal module 246 and a hole-filling module 249, the storage unit 24 further stores a depth plane dividing module 249. The modules are, for example, computer programs capable of being loaded into the processing unit 26 for executing functions of optimizing depth information.

Figure 12:
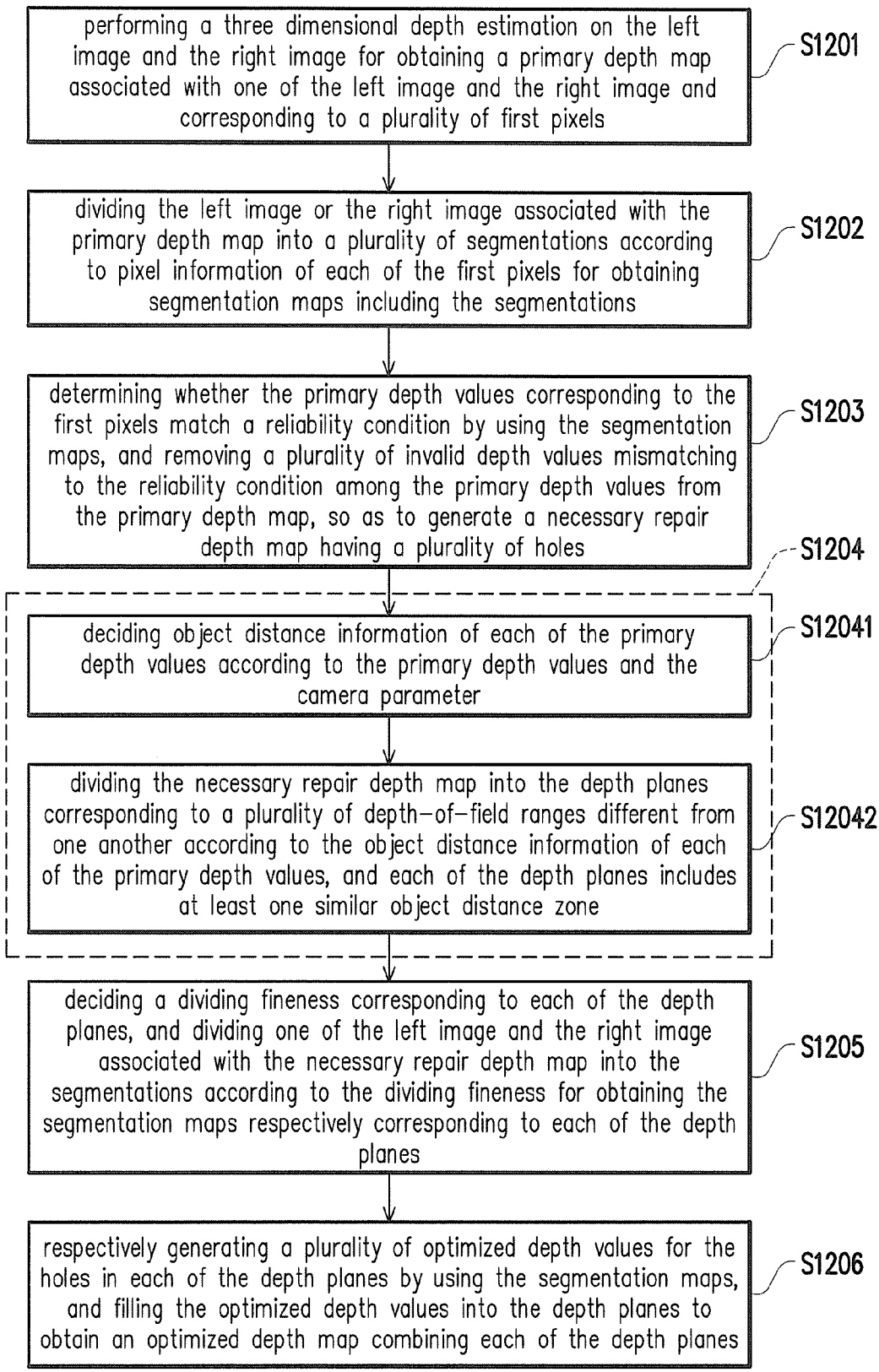
FIG. 12 is a flowchart illustrating a method for optimizing depth information according to an embodiment of the invention.

FIG. 12 is a flowchart illustrating a method for optimizing depth information according to an embodiment of the invention. Referring to FIG. 12, the method of the present embodiment is adapted to the image processing apparatus 20 depicted in FIG. 11. The following detailed steps are elaborated to describe the method for optimizing depth information of the invention with the reference to each element of the image processing apparatus 20.

First, the depth estimation module 242 performs a three dimensional depth estimation on the left image and the right image for obtaining a primary depth map associated with one of the left image and the right image and corresponding to a plurality of first pixels (step S1201). Next, the segmentation map obtaining module 244 divides the left image and the right image associated with the primary depth map into a plurality of segmentations according to pixel information of each of the first pixels for obtaining a plurality of segmentation maps including the segmentations (step S1202). Thereafter, the invalid depth removal module 246 determines whether the primary depth values corresponding to the first pixels match a reliability condition by using the segmentation maps, and removes a plurality of invalid depth values mismatching to the reliability condition among the primary depth values from the primary depth map, so as to generate a necessary repair depth map having a plurality of holes (step S1203).

More specifically, the invalid depth removal module 246 divides the primary depth map into a plurality of depth segmentations according to any one of the segmentation maps, and pertains a statistics operation on the primary depth values in each of the depth segmentations to obtain a statistic result. The invalid depth removal module 246 determines whether the primary depth values are a plurality of first invalid depth values among the invalid depth values according to the statistic result, and removes the first invalid depth values from the primary depth map, so as to generate holes on the necessary repair depth map.

Step S1201 to step S1203 are similar or identical to step S201 to step S203 depicted in FIG. 2, thus descriptions thereof are not repeated hereinafter. Unlike the foregoing embodiments, after the necessary repair depth map is generated, the depth plane dividing module 249 of the present embodiment obtains the necessary repair depth map, and partitions the necessary repair depth map into a plurality of depth planes according to a plurality of primary depth values and a camera parameter (step S1204). In other words, the depth plane dividing module 249 is capable of dividing the necessary repair depth map into different depth planes according to object distance information of the raw image, and each of the depth planes is corresponding to a different depth-of-field ranges. It can be known that, each of the depth planes also includes the holes generated by removing the invalid depth values.

More specifically, step S1204 may be divided into sub-step S12041 to sub-step S12042. First, the depth plane dividing module 249 decides object distance information of each of the primary depth values according to the primary depth values on the primary depth map or the necessary repair depth map and the camera parameter (sub-step S12041). Specifically, the depth plane dividing module 249 is capable of calculating real object distance information corresponding to each of the primary depth value according to the camera parameter such as focus information of the three dimensional imaging system when capturing the left and right images and the spacing between the dual lenses. In other words, according to the focus of lenses when capturing images and the spacing between the dual lenses, the depth plane dividing module 249 may be informed of the object distance information corresponding to each of the first pixels. Herein, the object distance represents a distance between the lens and a capturing object.

Thereafter, the depth plane dividing module 249 divides the necessary repair depth map into the depth planes corresponding to a plurality of depth-of-field ranges different from one another according to the object distance information of each of the primary depth values, and each of the depth planes includes at least one similar object distance zone (sub-step S12042). Specifically, according to the focus information of the lenses, the depth plane dividing module 249 may be informed of the distances from the lenses to the objects on the raw left image and the raw right image through calculation, and the depth plane dividing module 249 may then divide the necessary repair depth map according to the distances between the objects and the lenses. In brief, the first pixel has the corresponding primary depth value, so that the depth plane dividing module 249 may obtain the object distance information corresponding to each of the first pixels according to the camera parameter and the primary depth value. Namely, the primary depth value also has the corresponding object distance information.

Accordingly, the depth plane dividing module 249 may classify each of the primary depth values in to the corresponding depth planes according to the object distance information corresponding to the primary depth value, so as to divide the necessary repair depth map into the depth planes corresponding to different depth-of-field ranges. However, the number of the depth planes and the corresponding depth-of-field ranges are not particularly limited by the invention, persons with ordinary knowledge in the art may decide the same based on actual applications. For instance, the depth plane dividing module 249 may divide the necessary repair depth map into three depth planes, which are a long-distance depth plane, a middle-distance depth plane and a close-distance depth plane. Table 1 is an example of the depth-of-field ranges corresponding to each of the depth planes, but the invention is not limited thereto. In view of above, the necessary repair depth map is divided into a plurality of similar object distance zones, and the similar object distance zones are classified into the corresponding depth plane according the object distance information thereof.

TABLE 1

| Long-distance depth plane | Depth-of-field range (meter): 5 meters to 8 meters |
|---|---|
| Middle-distance depth plane | Depth-of-field range (meter): 2 meters to 5 meters |
| Close-distance depth plane | Depth-of-field range (meter): 0 meters to 2 meters |

Figure 13:
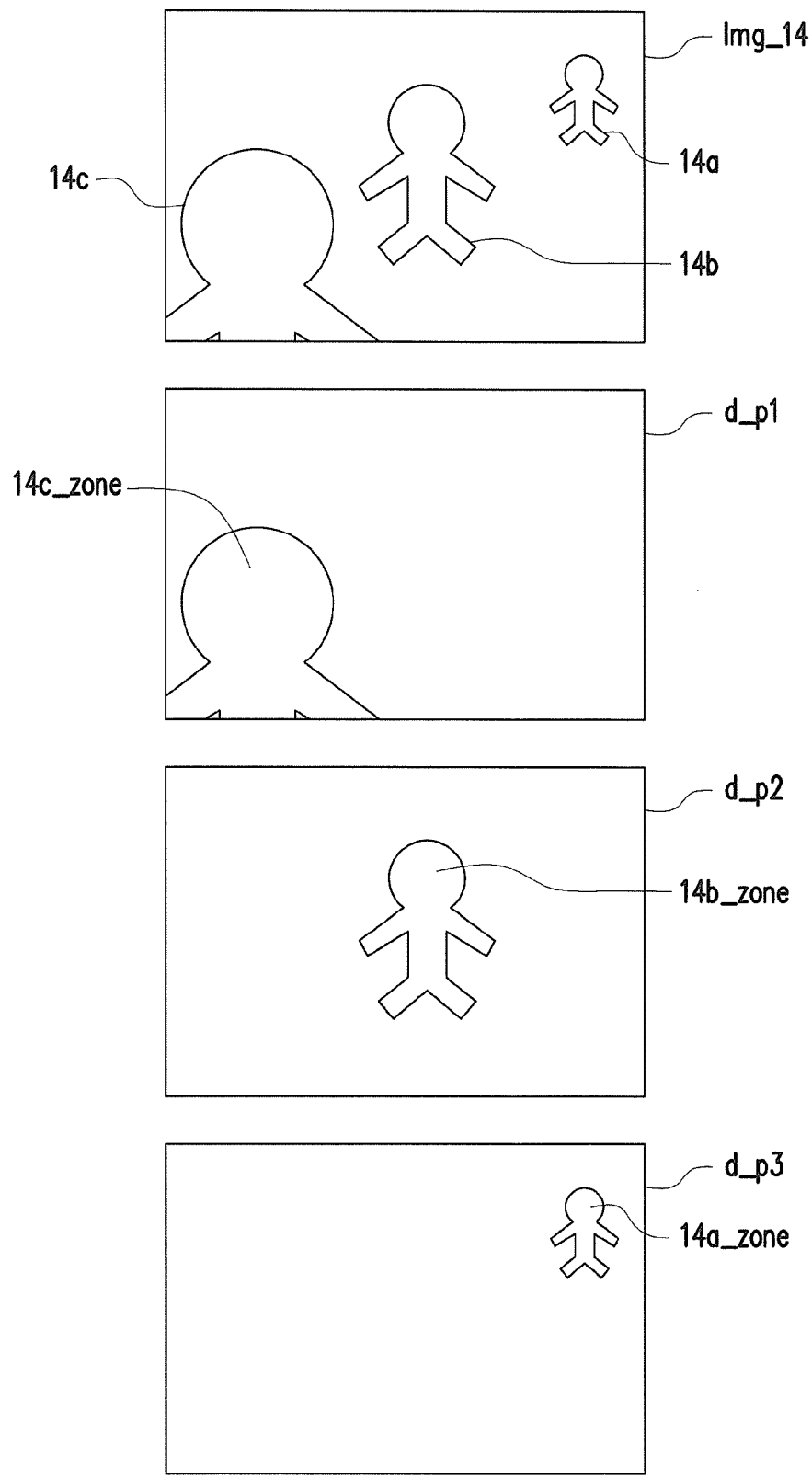
FIG. 13 is a schematic diagram illustrating an example of the depth plane according to an embodiment of the invention.

To further explain the invention more clearly, FIG. 13 is a schematic diagram illustrating an example of the depth plane according to an embodiment of the invention. Referring to FIG. 13, it is assumed that an image Img_14 includes capturing objects 14a, 14b and 14c. Upon comparison, a distance between the capturing object 14c and the lenses is the closest; a distance between the capturing object 14a and the lenses is the farthest; and the capturing object 14b is between the capturing object 14c and the capturing object 14*a*. In this example, the depth plane dividing module 249 may obtain the necessary repair depth map associated with the image Img_14, and the depth plane dividing module 249 may divide the necessary repair depth map into three depth planes d_p1, d_p2 and d_p3 respectively corresponding to three depth-of-field ranges according to the object distance information of each of the primary depth values.

As shown in FIG. 13, the similar object distance zone 14*c*_zone corresponding the capturing object 14*c* with the closest object distance belongs to the depth plane d_p1. The similar object distance zone 14*b*_zone corresponding the capturing object 14*b* belongs to the depth plane d_p2, and the similar object distance zone 14*a* zone corresponding the capturing object 14*a* with the farthest object distance belongs to the depth plane d_p3. By analogy, the necessary repair depth map may be divided into a plurality of depth planes according to the object distance information corresponding to each of the primary depth values.

Furthermore, after the necessary repair depth map is divided into the depth planes, the segmentation map obtaining module 244 decides a dividing fineness corresponding to each of the depth planes, and divides one of the left image and the right image associated with the necessary repair depth map into the segmentations according to the dividing fineness for obtaining the segmentation maps respectively corresponding to each of the depth planes (sub-step S1205). More specifically, the depth planes are respectively corresponding to a plurality of depth-of-field ranges different from one another, and the dividing fineness of each of the depth planes is decided based on the depth of filed range corresponding to each of the depth planes.

In an embodiment, the dividing fineness decided by the segmentation map obtaining module 244 for the depth plane with farther depth-of-field range is finer (has a higher density). On the contrary, the dividing fineness decided by the segmentation map obtaining module 244 for the depth plane with closer depth-of-field range is coarser (has a lower density). As a result, the present embodiment is capable of adaptively choose the segmentation maps for filling the holes, so as to generate the optimized depth values which are more close to the real condition.

In brief, the segmentation map obtaining module 244 compares a first neighboring pixel and a second neighboring pixel neighboring to each other among the first pixels for obtaining a pixel value difference. Whether to connect the first neighboring pixel and the second neighboring pixel is decided according to whether the pixel value difference is less than a difference threshold, so as to partition each of the first pixels into the corresponding segmentations, wherein the dividing fineness of the segmentation maps is decided according to the difference threshold. In addition, the segmentation map obtaining module 244 restricts the segmentation dimension of each of the segmentations according to a dimension threshold to obtain the segmentation maps. The segmentation dimension of each of the segmentations is not greater than the dimension threshold, and the dividing fineness of the segmentation maps is decided according to the dimension threshold. Nevertheless, detailed descriptions regarding how to decide the dividing fineness for the segmentation map and how to generate the segmentation map have been described in the foregoing embodiments and are not repeated hereinafter.

In other words, the invention is capable of filling the holes for the different depth planes according to the segmentation maps with different dividing finenesses. In an embodiment, for the depth plane with farther depth-of-field range, the finer dividing fineness having the higher density are used to generate the optimized depth values for filling the holes; whereas for the depth plane with closer depth-of-field range, the coarser dividing fineness having the lower density are used to generate the optimized depth values for filling the holes. Thereafter, the hole-filling module 248 respectively generates a plurality of optimized depth values for the holes in each of the depth planes by using the segmentation maps, and fills the optimized depth values into the depth planes to obtain an optimized depth map combining each of the depth planes (sub-step S1206). In other words, the hole-filling module 248 is capable of filling the holes for each of the depth planes by using the segmentation maps with different dividing fineness, and obtaining a complete optimized depth map by combining each of the depth planes with the holes filled.

Figure 14:
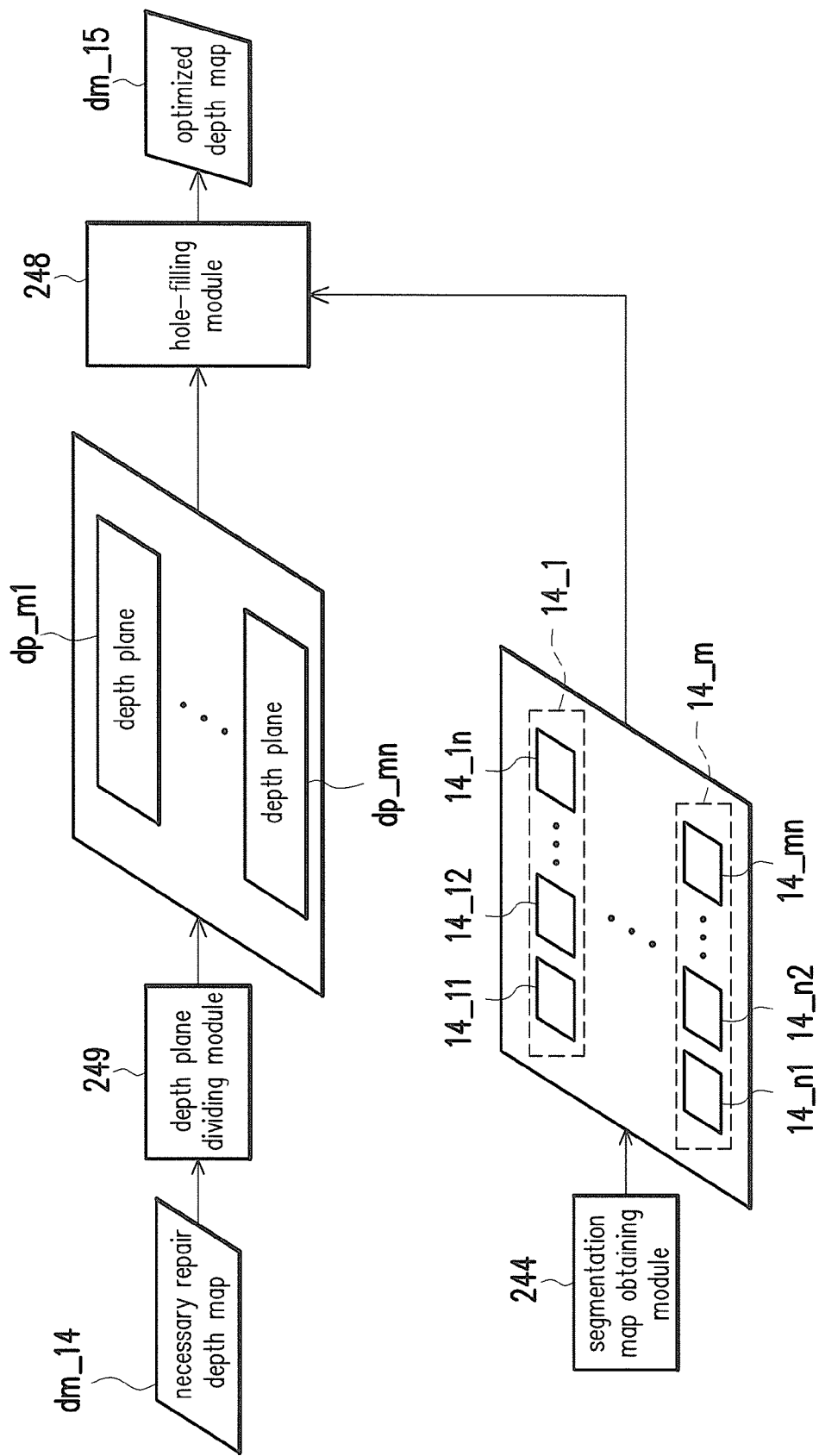
FIG. 14 is a schematic diagram illustrating operations for filling the holes for the necessary repair depth map according to an embodiment of the invention.

FIG. 14 is a schematic diagram illustrating operations for filling the holes for the necessary repair depth map according to an embodiment of the invention. Referring to FIG. 14, the hole-filling module 248 fills a necessary repair depth map dm_14 according to the segmentation maps generated by the segmentation map obtaining module 244 to generate the optimized depth map dm_15. It is specially noted that, before filling the holes by using the segmentation maps, the depth plane dividing module 249 divides the necessary repair depth map dm_14 into a plurality of depth planes dp_m1 to dp_mm corresponding to a plurality of depth-of-field ranges according to the camera parameter.

On the other hand, the segmentation map obtaining module 244 generates segmentation map groups 14_1 to 14_*m* corresponding to different dividing finenesses for each of the depth planes dp_m1 to dp_mm. In brief, based on the descriptions for FIG. 2 and FIG. 3, it can be known that, the difference threshold and the dimension threshold can be used to decide the dividing fineness of the segmentation maps. In other words, the segmentation map obtaining module 244 may generate the segmentation map groups 14_1 to 14_*m* having different dividing finenesses according to the settings of the difference threshold and the dimension threshold. Therein, the segmentation map group 14_1 includes segmentation maps 14_11 to 14_1*n* having the dividing finenesses similar to one another, and the segmentation map group 14*m* includes segmentation maps 14_*m*1 to 14_*mn* having the dividing finenesses similar to one another. A method for generating the segmentation map groups 14_1 to 14_*m* is similar to that of the embodiment depicted in FIG. 8.

Accordingly, in an embodiment, the hole-filling module 248 is capable of filling the holes for the each of the depth planes dp_m1 to dp_mm according to the segmentation map groups 14_1 to 14_*m* which are corresponding to the different dividing finenesses. For instance, the hole-filling module 248 generates the optimized depth values for the holes on the depth plane dp_m1 according to the segmentation maps in the segmentation map group 14_1, and fills the calculated optimized depth values into the corresponding holes.

Nevertheless, detailed descriptions regarding how the hole-filling module generates the optimized depth values and the holes by using the segmentation maps have been described in the foregoing embodiments and are not repeated hereinafter. In brief, the hole-filling module 248 may divide the similar object distance zone of each of the depth planes into a plurality of depth segmentations according to the segmentation maps respectively corresponding to each of the depth planes, and obtain a valid density value according to an amount of the holes in each of the depth segmentations. Thereafter, the hole-filling module 248 decides whether to calculate a depth statistic value of each of the depth segmentations according to the valid density value, and fills a part of the holes by using the depth statistic value to serve as one of the optimized depth values. In brief, a coverage of the depth segmentations decides how many of the neighboring depth values surrounding the holes are to be fetched by the hole-filling module 248 for calculating the optimized depth values. In addition, the hole-filling module 248 may also obtain a processing sequence of each of the depth segmentations according to the valid density value of each of the depth segmentations, and decide whether to fill the holes in each of the depth segmentations according to whether the processing sequence is a high priority sequence.

In summary, according to the embodiments of the invention for optimizing depth information, the depth map may be optimized by using raw image information provided by the raw left image and the raw right image. In addition, the invention is also capable of dividing the necessary repair depth map into the depth planes, and filling the holes for each of the depth planes by using the segmentation maps having the dividing finenesses different from one another's, respectively. As a result, the invention is capable of flexibly deciding an amount of neighboring information for deciding the optimized depth values, and including the actual object distance information to generate the optimized depth values which are more close to the real condition. Accordingly, the optimized depth values for filling the holes in the depth map which is generated according to the information surrounding the holes, so as to generate the depth map with low noise and high accuracy.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. A method for optimizing depth information, for an electronic device, wherein a left image and a right image are generated through shooting of a three dimensional imaging system, and the method comprises:
   obtaining a primary depth map associated with one of the left image and the right image and corresponding to a plurality of first pixels, wherein the primary depth map records the primary depth values respectively corresponding to the first pixels;
   dividing one of the left image and the right image into a plurality of segmentations according to pixel information of the first pixels to obtain a plurality of segmentation maps, comprising:
      deciding a dividing fineness of each of the depth planes, and dividing the one of the left image and the right image associated with the necessary repair depth map into the segmentations according to the dividing finenesses for obtaining the segmentation maps respectively corresponding to each of the depth planes, wherein the depth planes are respectively corresponding to a plurality of depth-of-field ranges different from one another, and the dividing fineness of each of the depth planes is decided based on the depth-of-field ranges corresponding to each of the depth planes, wherein the step of dividing the one of the left image and the right image associated with the necessary repair depth map into the segmentations according to the dividing finenesses comprises:
         restricting a segmentation dimension of each of the segmentations according to a dimension threshold to obtain the segmentation maps, wherein the segmentation dimension of each of the segmentations is not greater than the dimension threshold, and the dividing fineness of the segmentation maps is decided according to the dimension threshold;
   determining whether the primary depth values corresponding to the first pixels match a reliability condition by using the segmentation maps, and removing a plurality of invalid depth values mismatching to the reliability condition among the primary depth values from the primary depth map so as to generate a necessary repair depth map having a plurality of holes;
   partitioning the necessary repair depth map into a plurality of depth planes according to the primary depth values and a camera parameter; and
   respectively generating a plurality of optimized depth values for the holes in each of the depth planes by using the segmentation maps, and filling the optimized depth values into the depth planes to obtain an optimized depth map combining each of the depth planes.

2. The method for optimizing depth information of claim 1, wherein the step of generating the necessary repair depth map, and partitioning the necessary repair depth map into the depth planes according to the primary depth values and the camera parameter comprises:
   deciding object distance information of each of the primary depth values according to the primary depth values and the camera parameter; and
   dividing the necessary repair depth map into the depth planes corresponding to a plurality of depth-of-field ranges different from one another according to the object distance information of each of the primary depth values, wherein each of the depth planes comprises at least one similar object distance zone.

3. The method for optimizing depth information of claim 1, wherein the left image or the right image being divided into the segmentations has a plurality of first pixels, and the step of dividing the one of the left image and the right image associated with the necessary repair depth map into the segmentations according to the dividing finenesses comprises:
   comparing a first neighboring pixel and a second neighboring pixel neighboring to each other among the first pixels for obtaining a pixel value difference; and
   deciding whether to connect the first neighboring pixel and the second neighboring pixel according to whether the pixel value difference is less than a difference threshold, so as to partition each of the first pixels into the corresponding segmentations, wherein the dividing fineness of the segmentation maps is decided according to the difference threshold.

4. The method for optimizing depth information of claim 1, wherein the step of respectively generating the optimized depth values for the holes in each of the depth planes by using the segmentation maps, and filling the optimized depth values into the depth planes to obtain the optimized depth map combining each of the depth planes comprises:
   dividing at least one similar object distance zone of each of the depth planes into a plurality of first depth segmentations according to the segmentation maps respectively corresponding to each of the depth planes, and obtaining a first valid density value according to an amount of the holes in each of the first depth segmentations; and deciding whether to calculate a first depth statistic value of each of the first depth segmentations according to the first valid density value, and filling a part of the holes by using the first depth statistic value served as one of the optimized depth values.

5. The method for optimizing depth information of claim 4, wherein the step of deciding whether to calculate the first depth statistic value of each of the first depth segmentations according to the first valid density value comprises:
obtaining a processing sequence of each of the first depth segmentations according to the first valid density value of each of the first depth segmentations, and deciding whether to fill the holes in each of the first depth segmentations according to whether the processing sequence is a high priority sequence.

6. The method for optimizing depth information of claim 1, wherein the step of determining whether the primary depth values corresponding to the first pixels match the reliability condition by using the segmentation map, and removing the invalid depth values mismatching to the reliability condition among the primary depth values from the primary depth map, so as to generate the necessary repair depth map having the holes comprises:
dividing the primary depth map into a plurality of depth segmentations according to the segmentation maps, and performing a statistics operation on the primary depth values in each of the depth segmentations to obtain a statistic result; and
determining whether the primary depth values are a plurality of first invalid depth values among the invalid depth values according to the statistic result, and removing the first invalid depth values from the primary depth map, so as to generate the holes on the necessary repair depth map.

7. An apparatus for optimizing depth information, wherein the apparatus obtains a left image and a right image through shooting of a three dimensional imaging system, and comprises:
a storage unit, configured to record a plurality of modules; and
one or more processing units, coupled to the storage unit to access and execute the modules recorded in the storage unit, and the modules comprising:
a depth estimation module, obtaining a primary depth map associated with one of the left image and the right image and corresponding to a plurality of first pixels, wherein the primary depth map records the primary depth values respectively corresponding to the first pixels;
a segmentation map obtaining module, dividing one of the left image and the right image into a plurality of segmentations according to pixel information of the first pixels for obtaining a plurality of segmentation maps, wherein the segmentation map obtaining module decides a dividing fineness of each of the depth planes and divides the one of the left image and the right image associated with the necessary repair depth map into the segmentations according to the dividing finenesses for obtaining the segmentation maps respectively corresponding to each of the depth planes, wherein the depth planes are respectively corresponding to a plurality of depth-of-field ranges different from one another, and the dividing fineness of each of the depth planes is decided based on the depth-of-field range corresponding to each of the depth planes, wherein the segmentation map obtaining module restricts a segmentation dimension of each of the segmentations according to a dimension threshold to obtain the segmentation maps, wherein the segmentation dimension of each of the segmentations is not greater than the dimension threshold, and the dividing fineness of the segmentation maps is decided according to the dimension threshold;
an invalid depth removal module, determining whether the primary depth values corresponding to the first pixels match a reliability condition by using the segmentation maps, and removing a plurality of invalid depth values mismatching to the reliability condition among the primary depth values from the primary depth map so as to generate a necessary repair depth map having a plurality of holes;
a depth plane dividing module, obtaining the necessary repair depth map, and partitioning the necessary repair depth map into a plurality of depth planes according to the primary depth values and a camera parameter; and
a hole-filling module, respectively generating a plurality of optimized depth values for the holes in each of the depth planes by using the segmentation maps, and filling the optimized depth values into the depth planes to obtain an optimized depth map combining each of the depth planes.

8. The apparatus for optimizing depth information of claim 7, wherein the depth plane dividing module decides object distance information of each of the primary depth values according to the primary depth values and the camera parameter; and divides the necessary repair depth map into the depth planes corresponding to a plurality of depth-of-field ranges different from one another according to the object distance information of each of the primary depth values, wherein each of the depth planes comprises at least one similar object distance zone.

9. The apparatus for optimizing depth information of claim 7, wherein the left image or the right image being divided into the segmentations has a plurality of first pixels, wherein the segmentation map obtaining module compares a first neighboring pixel and a second neighboring pixel neighboring to each other among the first pixels for obtaining a pixel value difference, and decides whether to connect the first neighboring pixel and the second neighboring pixel according to whether the pixel value difference is less than a difference threshold, so as to partition each of the first pixels into the corresponding segmentations, wherein the dividing fineness of the segmentation maps is decided according to the difference threshold.

10. The apparatus for optimizing depth information of claim 7, wherein the hole-filling module divides at least one similar object distance zone of each of the depth planes into a plurality of first depth segmentations according to the segmentation maps respectively corresponding to each of the depth planes, obtains a first valid density value according to an amount of the holes in each of the first depth segmentations, decides whether to calculate a first depth statistic value of each of the first depth segmentations according to the first valid density value, and fills a part of the holes by using the first depth statistic value served as one of the optimized depth values.

11. The apparatus for optimizing depth information of claim 10, wherein the hole-filling module obtains a processing sequence of each of the first depth segmentations according to the first valid density value of each of the first depth segmentations, and decides whether to fill the holes in each of the first depth segmentations according to whether the processing sequence is a high priority sequence.

12. The apparatus for optimizing depth information of claim 7, wherein the invalid depth removal module divides the primary depth map into a plurality of depth segmentations according to the segmentation maps, performs a statistics operation on the primary depth values in each of the depth segmentations to obtain a statistic result, determines whether the primary depth values are a plurality of first invalid depth values among the invalid depth values according to the statistic result, and removes the first invalid depth values from the primary depth map, so as to generate the holes on the necessary repair depth map.

13. A method for optimizing depth information, for an electronic device, wherein a left image and a right image are generated through shooting of a three dimensional imaging system, and the method comprises:
  obtaining a primary depth map associated with one of the left image and the right image and corresponding to a plurality of first pixels, wherein the primary depth map records the primary depth values respectively corresponding to the first pixels;
  dividing one of the left image and the right image into a plurality of segmentations according to pixel information of the first pixels to obtain a plurality of segmentation maps, comprising:
    deciding a dividing fineness of each of the depth planes, and dividing the one of the left image and the right image associated with the necessary repair depth map into the segmentations according to the dividing finenesses for obtaining the segmentation maps respectively corresponding to each of the depth planes, wherein the depth planes are respectively corresponding to a plurality of depth-of-field ranges different from one another, and the dividing fineness of each of the depth planes is decided based on the depth-of-field ranges corresponding to each of the depth planes;
  determining whether the primary depth values corresponding to the first pixels match a reliability condition by using the segmentation maps, and removing a plurality of invalid depth values mismatching to the reliability condition among the primary depth values from the primary depth map so as to generate a necessary repair depth map having a plurality of holes;
  partitioning the necessary repair depth map into a plurality of depth planes according to the primary depth values and a camera parameter; and
  respectively generating a plurality of optimized depth values for the holes in each of the depth planes by using the segmentation maps, and filling the optimized depth values into the depth planes to obtain an optimized depth map combining each of the depth planes comprising:
    dividing at least one similar object distance zone of each of the depth planes into a plurality of first depth segmentations according to the segmentation maps respectively corresponding to each of the depth planes, and obtaining a first valid density value according to an amount of the holes in each of the first depth segmentations; and
    deciding whether to calculate a first depth statistic value of each of the first depth segmentations according to the first valid density value, and filling a part of the holes by using the first depth statistic value served as one of the optimized depth values.

14. An apparatus for optimizing depth information, wherein the apparatus obtains a left image and a right image through shooting of a three dimensional imaging system, and comprises:
  a storage unit, configured to record a plurality of modules; and
  one or more processing units, coupled to the storage unit to access and execute the modules recorded in the storage unit, and the modules comprising:
    a depth estimation module, obtaining a primary depth map associated with one of the left image and the right image and corresponding to a plurality of first pixels, wherein the primary depth map records the primary depth values respectively corresponding to the first pixels;
    a segmentation map obtaining module, dividing one of the left image and the right image into a plurality of segmentations according to pixel information of the first pixels for obtaining a plurality of segmentation maps, wherein the segmentation map obtaining module decides a dividing fineness of each of the depth planes and divides the one of the left image and the right image associated with the necessary repair depth map into the segmentations according to the dividing finenesses for obtaining the segmentation maps respectively corresponding to each of the depth planes, wherein the depth planes are respectively corresponding to a plurality of depth-of-field ranges different from one another, and the dividing fineness of each of the depth planes is decided based on the depth-of-field range corresponding to each of the depth planes;
    an invalid depth removal module, determining whether the primary depth values corresponding to the first pixels match a reliability condition by using the segmentation maps, and removing a plurality of invalid depth values mismatching to the reliability condition among the primary depth values from the primary depth map so as to generate a necessary repair depth map having a plurality of holes;
    a depth plane dividing module, obtaining the necessary repair depth map, and partitioning the necessary repair depth map into a plurality of depth planes according to the primary depth values and a camera parameter; and
    a hole-filling module, respectively generating a plurality of optimized depth values for the holes in each of the depth planes by using the segmentation maps, and filling the optimized depth values into the depth planes to obtain an optimized depth map combining each of the depth planes, wherein the hole-filling module divides at least one similar object distance zone of each of the depth planes into a plurality of first depth segmentations according to the segmentation maps respectively corresponding to each of the depth planes, obtains a first valid density value according to an amount of the holes in each of the first depth segmentations, decides whether to calculate a first depth statistic value of each of the first depth segmentations according to the first valid density value, and fills a part of the holes by using the first depth statistic value served as one of the optimized depth values.

* * * * *